United States Patent
Horn et al.

(10) Patent No.: US 11,134,438 B2
(45) Date of Patent: *Sep. 28, 2021

(54) SELECTION OF A SERVING NODE IN A WIRELESS COMMUNICATION SYSTEM

(71) Applicant: QUALCOMM Incorporated, San Diego, CA (US)

(72) Inventors: Gavin Bernard Horn, La Jolla, CA (US); Stefano Faccin, San Ysidro, CA (US)

(73) Assignee: QUALCOMM Incorporated, San Diego, CA (US)

(*) Notice: Subject to any disclaimer, the term of this patent is extended or adjusted under 35 U.S.C. 154(b) by 55 days.

This patent is subject to a terminal disclaimer.

(21) Appl. No.: 16/675,087

(22) Filed: Nov. 5, 2019

(65) Prior Publication Data
US 2020/0077331 A1 Mar. 5, 2020

Related U.S. Application Data

(63) Continuation of application No. 15/823,389, filed on Nov. 27, 2017, now Pat. No. 10,470,118, which is a (Continued)

(51) Int. Cl.
*H04W 4/00* (2018.01)
*H04W 48/20* (2009.01)
(Continued)

(52) U.S. Cl.
CPC ............ *H04W 48/20* (2013.01); *H04W 8/065* (2013.01); *H04W 72/0406* (2013.01); *H04W 76/11* (2018.02); *H04W 88/16* (2013.01)

(58) Field of Classification Search
CPC ....... H04W 8/06; H04W 8/065; H04W 48/20; H04W 72/02; H04W 72/021;
(Continued)

(56) References Cited

U.S. PATENT DOCUMENTS 7,940,697 B2  5/2011  Savolainen et al.
8,457,635 B2  6/2013  Bachmann et al.
(Continued)

FOREIGN PATENT DOCUMENTS

CN  101651588 A  2/2010
CN  101868036 A  10/2010
(Continued)

OTHER PUBLICATIONS

3GPP TS 23.401 V13.0.0 (Sep. 2014), 3rd Generation Partnership Project;Technical Specification Group Services and System Aspects;General Packet Radio Service (GPRS) enhancements for Evolved Universal Terrestrial Radio Access Network (E-UTRAN) access (Release 13), 2014, pp. 1-308.
(Continued)

*Primary Examiner* — Frank Duong
(74) *Attorney, Agent, or Firm* — Qualcomm IP Dept.; James Hunt Yancey, Jr.

(57) ABSTRACT

Some aspects of the disclosure provide various methods, apparatuses and computer-readable medium configured for wireless communication. A method operable at a user equipment (UE) may include transmitting a connection request message configured to request initial connection with a radio access network (RAN) node. The connection request message may include information configured to indicate a service profile of the UE. A method operable at the RAN node may include receiving the connection request message from the UE. The connection request message may include information configured to indicate the service profile of the UE. A method operable at a serving node may include receiving a connection request message from the RAN node. The connection request message may be configured to establish communication with the UE and may include a service profile corresponding to the UE.

38 Claims, 18 Drawing Sheets

Related U.S. Application Data continuation of application No. 14/659,435, filed on Mar. 16, 2015, now Pat. No. 9,832,719.

(60) Provisional application No. 62/065,514, filed on Oct. 17, 2014.

(51) Int. Cl.
*H04W 8/06* (2009.01)
*H04W 76/11* (2018.01)
*H04W 72/04* (2009.01)
*H04W 88/16* (2009.01)

(58) Field of Classification Search
CPC . H04W 72/04; H04W 72/0406; H04W 76/02; H04W 76/021; H04W 76/11; H04W 88/16
See application file for complete search history.

(56) References Cited

U.S. PATENT DOCUMENTS

| | | | |
|---|---|---|---|
| 8,582,515 | B2 | 11/2013 | Schuringa et al. |
| 8,824,598 | B2 | 9/2014 | Dimou et al. |
| 9,055,520 | B2 * | 6/2015 | Salot ............... H04W 76/10 |
| 9,167,506 | B2 | 10/2015 | Faccin et al. |
| 9,271,222 | B2 * | 2/2016 | Xie ............... H04W 48/08 |
| 9,271,316 | B2 | 2/2016 | Bakker et al. |
| 9,706,530 | B2 | 7/2017 | Zembutsu et al. |
| 9,832,719 | B2 | 11/2017 | Horn et al. |
| 10,470,118 | B2 | 11/2019 | Horn et al. |
| 2009/0217038 | A1 | 8/2009 | Lehtovirta et al. |
| 2012/0094629 | A1 | 4/2012 | Liu et al. |
| 2012/0134268 | A1 | 5/2012 | Lopez et al. |
| 2012/0252481 | A1 | 10/2012 | Anpat et al. |
| 2012/0287854 | A1 | 11/2012 | Xie et al. |
| 2012/0302196 | A1 | 11/2012 | Chin et al. |
| 2014/0086177 | A1 | 3/2014 | Adjakple et al. |
| 2014/0169269 | A1 | 6/2014 | Salot et al. |
| 2014/0211728 | A1 | 7/2014 | Zembutsu et al. |
| 2014/0269525 | A1 | 9/2014 | Li et al. |
| 2015/0189564 | A1 * | 7/2015 | Duan ............... H04W 36/14 455/435.3 |
| 2016/0112943 | A1 | 4/2016 | Horn et al. |
| 2018/0084490 | A1 | 3/2018 | Horn et al. |

FOREIGN PATENT DOCUMENTS

| | | |
|---|---|---|
| CN | 102123477 A | 7/2011 |
| EP | 2523505 A1 | 11/2012 |
| EP | 2524542 A2 | 11/2012 |
| EP | 2550817 A2 | 1/2013 |
| EP | 2747376 A1 | 6/2014 |
| EP | 2763496 A1 | 8/2014 |
| EP | 2789131 A1 | 10/2014 |
| EP | 2863684 A1 | 4/2015 |
| EP | 2747376 B1 | 6/2018 |
| JP | 2006304116 A | 11/2006 |
| JP | 2014146950 A | 8/2014 |
| JP | 2017532904 A | 11/2017 |
| KR | 20140046071 A | 4/2014 |
| WO | 2006114628 A2 | 11/2006 |
| WO | 2009096833 A1 | 8/2009 |
| WO | 2010141788 A2 | 12/2010 |
| WO | 2010143428 A1 | 12/2010 |
| WO | 2013037842 A1 | 3/2013 |
| WO | 2013047822 A1 | 4/2013 |
| WO | 2013187144 A1 | 12/2013 |
| WO | 2016060897 A1 | 4/2016 |

OTHER PUBLICATIONS

3rd Generation Partnership Project, Technical Specification Group Services and System Aspects, General Packet Radio Service (GPRS), Service description, Stage 2, Release 12, 3GPP TS 23.060 V12.6.0 (Sep. 2014), Sep. 2014, pp. 1-349.
Barton B., LTE and Beyond, LTE attach procedure, Jan. 28, 2012, pp. 1-10, Retrieved from the internet, URL: lteandbeyond http://www.lteandbeyond.com/2012/01/lte-attach-procedure.html, 8 pages.
Chapter II Demand and Response Under PCT Article 34—PCT/US2015/054324—ISA/EPO—dated Apr. 29, 2016.
CNIPA Office Action for Chinese Patent Application No. 201580055359.1 dated Jul. 3, 2019 (Original and Translation provided by CN Counsel).
European Search Report—EP18205379—Search Authority—Munich—dated Dec. 13, 2018.
European Search Report—EP18205388—Search Authority—Munich—dated Dec. 13, 2018.
International Preliminary Report on Patentability from International Application No. PCT/US2015/054324—ISA/EPO—dated Jul. 15, 2016.
International Search Report and Written Opinion—PCT/US2015/054324—ISA/EPO—dated Jan. 4, 2016.
LTE Attach and Default Bearer Setup Messaging, 2012, Retrieved from the internet, URL: https://www.eventhelix.com/lte/attach/LTE-Attach-Messaging.pdf, 14 pages.
Motorola: "Reactive Load Management for MTC Devices", 3GPP Draft S2-103176_MTC_REACTIVE_LOAD_MANAGEMENT-V4, 3rd Generation Partnership Project (3GPP), Mobile Competence Centre, 658, Route Des Lucioles, F-06921 Sophia-Antipolis Cedex, France, vol. SA WG2, No. Elbonia, Jul. 6, 2010-Jul. 13, 2010, Jun. 29, 2010 (Jun. 29, 2010), XP050630894, [retrieved on Jun. 29, 2010] paragraph [02.2].
SA2, Alessio Casati and Alcatel-Lucent, "LS on SMS Support Over SGs", S2-094953, 3GPP TSG-SA WG2 Meeting #74, Sophia Antipolis, France, Jul. 6-10, 2009, 19 pages.
Taiwan Search Report—TW104133063—TIPO—dated Apr. 26, 2018. (English-language translation of search/examination report provided by foreign associate).
Taiwan Search Report—TW107133118—TIPO—dated Mar. 16, 2020.(English-language translation of search/examination report provided by foreign associate).
Japanese Patent Office Decision for JP Application No. 2017-519479 (Appeal No. 2019-11301) dated Jun. 22, 2020, 8 pages (Original JP language document and English-language translation provided by foreign counsel).
Vodafone, Research in Motion, Alcatel-Lucent, Starent Networks, "Attach and TAU for CS-SMS only", CP-090697, 3GPP TSG-CT Plenary Meeting #45, Sevilla, Spain, Sep. 16-18, 2009, 22 pages.
Taiwan Search Report—TW107133118—TIPO—dated Mar. 16, 2020.
Taiwan Search Report—TW104133063—TIPO—dated Apr. 26, 2018.

* cited by examiner

US 11,134,438 B2

SELECTION OF A SERVING NODE IN A WIRELESS COMMUNICATION SYSTEM

CLAIM OF PRIORITY UNDER 35 U.S.C. § 120

The present Application for Patent is a Continuation of patent application Ser. No. 15/823,389, titled, "Selection of a Serving Node in a Wireless Communication System" and filed in the United States Patent and Trademark Office on Nov. 27, 2017, which is a Continuation of patent application Ser. No. 14/659,435, filed in the United States Patent and Trademark Office on Mar. 16, 2015, which issued as U.S. Pat. No. 9,832,719, which claims priority to Provisional Patent Application No. 62/065,514, filed in the United States Patent and Trademark Office on Oct. 17, 2014. All of the above referenced applications are assigned to the assignee hereof, and the entire contents of which are hereby incorporated herein by reference as if fully set forth below and for all applicable purposes.

TECHNICAL FIELD

The present disclosure relates generally to communication systems and, more particularly, to selection of a serving node in a wireless communication system.

BACKGROUND

Wireless communication systems are widely deployed to provide various telecommunication services such as telephony, video, data, messaging, and broadcasts. Such wireless technologies have undergone many stages of improvement in various telecommunication standards, each providing protocols that enable various wireless devices to communicate on a municipal, national, regional, and global level. Such wireless communication system may include various components, such as a user equipment (UE), a radio access network (RAN) node, and a serving node. An example of an existing telecommunication standard is Long Term Evolution (LTE), which may also be known as an evolved packet system (EPS). In LTE, the RAN node may be an evolved Node B (eNB), and the serving node may be a Mobility Management Entity (MME).

In existing communication systems (e.g., LTE), selection of the serving node (e.g., MME) may be performed in part based on load balancing. Load balancing may avoid disproportionate overloading of one serving node relative to another serving node. However, existing communication systems may not best accommodate the complexities introduced by the device types and/or services operable at various UEs. Accordingly, existing communication systems may benefit from features that better accommodate such complexities and provide further enhancements to the overall user experience.

BRIEF SUMMARY OF SOME EMBODIMENTS

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In an aspect, the present disclosure provides a method of wireless communication operable at a user equipment (UE). The method may include transmitting a connection request message configured to request initial connection with a radio access network (RAN) node, and the connection request message may include information configured to indicate a service profile of the UE. Some aspects of the present disclosure provide a UE configured for wireless communication. The UE may include a transceiver, a memory, and at least one processor communicatively coupled to the transceiver and the memory. The at least one processor may be configured to utilize the transceiver to transmit a connection request message configured to request initial connection with a RAN node, and the connection request message may include information configured to indicate a service profile of the UE. Some aspects of the present disclosure provide a computer-readable medium including computer-executable code. The computer-executable code may be configured for transmitting a connection request message configured to request initial connection with a RAN node, and the connection request message may include information configured to indicate a service profile of the UE. Some aspects of the present disclosure provide a UE configured for wireless communication. The UE may include means for transmitting a connection request message configured to request initial connection with a RAN node, and the connection request message comprising information configured to indicate a service profile of the UE.

In another aspect, the present disclosure provides a method of wireless communication operable at a RAN node. The method may include receiving a connection request message from a UE, and the connection request message may include information configured to indicate a service profile of the UE. The method may also include selecting a serving node for the UE at least in part based on the service profile of the UE. The method may also include forwarding the connection request message to the selected serving node. Some aspects of the present disclosure provide a RAN node configured for wireless communication. The RAN node may include a transceiver, a memory, and at least one processor communicatively coupled to the transceiver and the memory. The at least one processor may be configured to utilize the transceiver to receive a connection request message from a UE, and the connection request message may include information configured to indicate a service profile of the UE. The at least one processor may be further configured to select a serving node for the UE at least in part based on the service profile of the UE. The at least one processor may be further configured to utilize the transceiver to forward the connection request message to the selected serving node. Some aspects of the present disclosure provide a computer-readable medium including computer-executable code. The computer-executable code may be configured for receiving a connection request message from a UE, and the connection request message may include information configured to indicate a service profile of the UE. The computer-executable code may be further configured for selecting a serving node for the UE at least in part based on the service profile of the UE. The computer-executable code may be further configured for forwarding the connection request message to the selected serving node. Some aspects of the present disclosure provide a RAN node configured for wireless communication. The RAN node may include means for receiving a connection request message from a UE, and the connection request message may include information configured to indicate a service profile of the UE. The RAN node may also include means for selecting a serving node for the UE at least in part based on the service profile of the UE. The RAN node may also include means for forwarding the connection request message to the selected serving node.

In yet another aspect, the present disclosure provides a method of wireless communication operable at a serving node. The method may include receiving a connection request message from a RAN node, and the connection request message may be configured to establish communication with a UE and may include a service profile corresponding to the UE. The method may also include determining an identifier for the UE, and the identifier may be a function of the service profile corresponding to the UE. The method may also include transmitting a connection accept message to the RAN node, and the connection accept message may include the identifier for the UE. Some aspects of the present disclosure provide a serving node configured for wireless communication. The serving node may include a transceiver, a memory, and at least one processor communicatively coupled to the transceiver and the memory. The at least one processor may be configured to utilize the transceiver to receive a connection request message from a RAN node, and the connection request message may be configured to establish communication with a UE and may include a service profile corresponding to the UE. The at least one processor may be further configured to determine an identifier for the UE, and the identifier may be a function of the service profile corresponding to the UE. The at least one processor may be further configured to utilize the transceiver to transmit a connection accept message to the RAN node, and the connection accept message may include the identifier for the UE. Some aspects of the present disclosure provide a computer-readable medium including computer-executable code. The computer-executable code may be configured for receiving a connection request message from a RAN node, and the connection request message may be configured to establish communication with a UE and may include a service profile corresponding to the UE. The computer-executable code may be further configured for determining an identifier for the UE, and the identifier may be a function of the service profile corresponding to the UE. The computer-executable code may be configured for transmitting a connection accept message to the RAN node, and the connection accept message may include the identifier for the UE. Some aspects of the present disclosure provide a serving node configured for wireless communication. The serving node may include means for receiving a connection request message from a RAN node, and the connection request message may be configured to establish communication with a UE and may include a service profile corresponding to the UE. The serving node may also include means for determining an identifier for the UE, and the identifier may be a function of the service profile corresponding to the UE. The serving node may also include means for transmitting a connection accept message to the RAN node, and the connection accept message may include the identifier for the UE.

These and other aspects of the invention will become more fully understood upon a review of the detailed description, which follows. Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. In an effort to provide various non-limiting examples to illustrate some of the aspects of the present disclosure, the description below may describe some features and embodiments in the context of a long-term evolution (LTE) architecture as it might be defined according to the third generation partnership project (3GPP). However, any LTE-specific terminology or entities are merely provided as non-limiting examples, and some aspects of the present disclosure may be implemented in any suitable network or technology.

Figure 1:
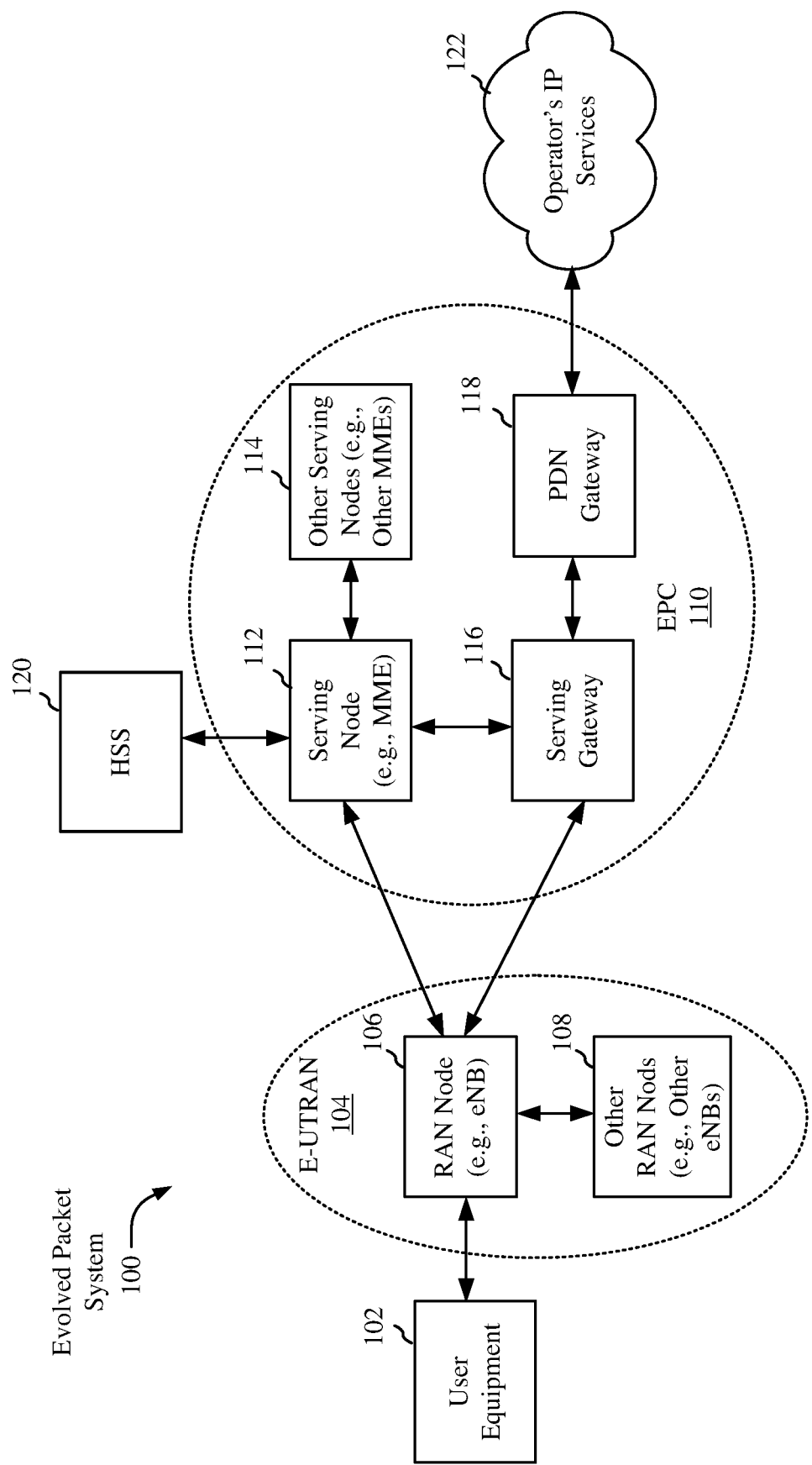
FIG. 1 is a diagram illustrating an example of a network architecture for an evolved packet system (EPS) according to some embodiments of the present disclosure.

FIG. 1 is a diagram illustrating an example of a network architecture for an evolved packet system (EPS) 100 according to some embodiments of the present disclosure. The network architecture of the EPS 100 may be an LTE network architecture or any other network architecture without deviating from the scope of the present disclosure. The EPS 100 may include one or more user equipment (UE) 102, an Evolved Universal Mobile Telecommunications Systems (UMTS) Terrestrial Radio Access Network (E-UTRAN) 104, an Evolved Packet Core (EPC) 110, a Home Subscriber Server (HSS) 120, and an Operator's IP Services 122. The EPS 100 can interconnect with other access networks (not shown). The EPS 100 provides packet-switched services; however, as those skilled in the art will readily appreciate, the various concepts presented throughout this disclosure may be extended to networks providing circuit-switched services.

The E-UTRAN 104 may include a radio access network (RAN) node 106. A non-limiting example of the RAN node 106 is an evolved Node B (eNB). The E-UTRAN 104 may also include other RAN nodes 108 (e.g., other eNBs). The RAN node 106 provides user and control plane protocol terminations toward the UE 102. The RAN node 106 may be connected to the other eNBs 108 via an X2 interface (i.e., backhaul). The RAN node 106 may also be referred to as a base station, a base transceiver station, a radio base station, a radio transceiver, a transceiver function, a basic service set (BSS), an extended service set (ESS), or some other suitable terminology. The RAN node 106 provides an access point to the EPC 110 for a UE 102. Examples of UEs 102 include a cellular phone, a smart phone, a tablet computer, a session initiation protocol (SIP) phone, a laptop, a personal digital assistant (PDA), a satellite radio, a global positioning system, a multimedia device, a video device, a digital audio player (e.g., MP3 player), a camera, a game console, a household appliance (e.g., a washing machine), or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The RAN node 106 is connected by an S1 interface to the EPC 110. The EPC 110 may include a Serving Gateway (SGW) 116 and a Packet Data Network (PDN) Gateway 118. The EPC 110 also includes a serving node 112. A non-limiting example of the serving node 112 is a Mobility Management Entity (MME) 112. The EPC 110 may also include various other serving nodes 114 (e.g., other MMEs). A serving node (SN) 112 may be a control node that processes signaling between the UE 102 and the EPC 110. Generally, the serving node 112 provides bearer and connection management. All user Internet protocol (IP) packets are transferred through the SGW 116, which itself is connected to the Packet Data Network (PDN) Gateway 118. The PDN Gateway 118 provides UE IP address allocation as well as other functions. The PDN Gateway 118 is connected to the Operator's IP Services 122. The Operator's IP Services 122 include the Internet, the Intranet, an IP Multimedia Subsystem (IMS), and a Packet-Switched Streaming Service (PSS).

Within the EPS 100, the serving node 112 supports a number of functions and interfaces, including non-access-stratum (NAS) signaling and security; access-stratum (AS) security control; tracking area list management; PDN Gateway 118 and SGW 116 selection; serving node (e.g., MME) selection for inter-serving node (e.g., inter-MME) handovers; inter-core network node signaling for mobility between 3GPP access networks; roaming and authentication; and EPS bearer management. Details of these functions and interfaces may be found in 3GPP technical specifications numbered 23.401, 23.402, and 23.002, incorporated herein by reference. The serving node 112 generally manages which services are active, as well as the UE's mobility. That is, the serving node 112 manages how to connect to a UE. When a UE is connected, the serving node 112 knows to which RAN node the UE is connected. When the UE is idle, the serving node 112 lists the RAN nodes to page the UE.

Figure 2:
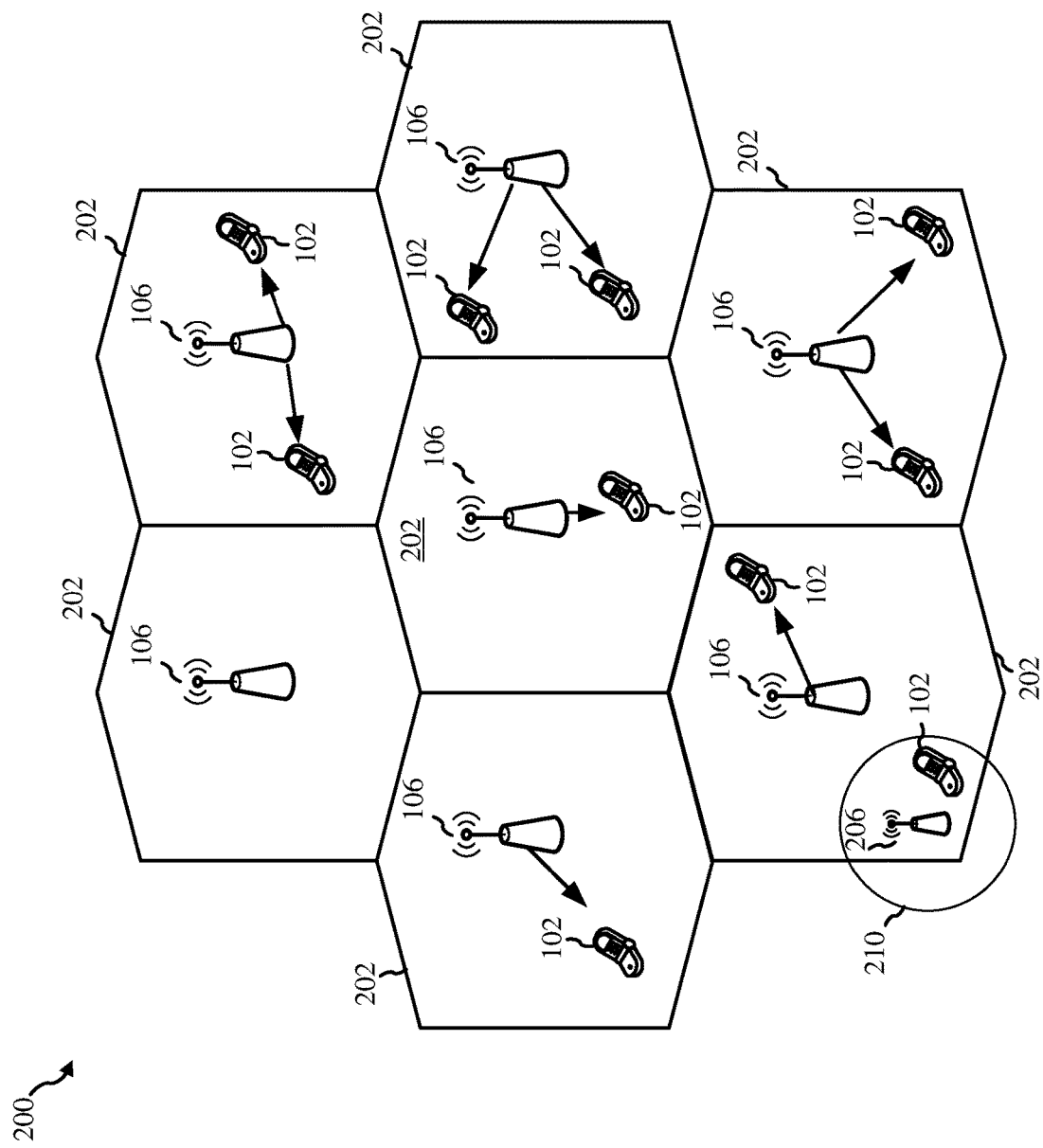
FIG. 2 is a diagram illustrating an example of an access network according to some embodiments of the present disclosure.

FIG. 2 is a diagram illustrating an example of an access network 200 in an LTE network architecture. In this example, the access network 200 is divided into a number of cellular regions (cells) 202. One or more lower power class RAN nodes 206 may have cellular regions 210 that overlap with one or more of the cells 202. The lower power class RAN node 206 may be a femto cell (e.g., home eNB (HeNB)), pico cell, micro cell, or remote radio head (RRH). The macro RAN nodes 106 are each assigned to a respective cell 202 and are configured to provide an access point to the EPC 110 for all the UEs 102 in the cells 202. There is no centralized controller in this example of an access network 200, but a centralized controller may be used in alternative configurations. The RAN nodes 106 are responsible for all radio related functions including radio bearer control, admission control, mobility control, scheduling, security, and connectivity to the SGW 116. A RAN node may support one or multiple (e.g., three) cells (also referred to as a sectors). The term "cell" can refer to the smallest coverage area of a RAN node and/or a RAN node subsystem serving are particular coverage area. Further, the terms "RAN node," "eNB," "base station," and/or "cell" may be used interchangeably herein without deviating from the scope of the present disclosure.

The modulation and multiple access scheme employed by the access network 200 may vary depending on the particular telecommunications standard being deployed. In LTE applications, orthogonal frequency division multiplexing (OFDM) is used on the downlink (DL) and single carrier frequency division multiple access (SC-FDMA) is used on the uplink (UL) to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The RAN nodes 106 may have multiple antennas supporting Multiple Input Multiple Output (MIMO) technology. The use of MIMO technology enables the RAN nodes 106 to exploit the spatial domain to support spatial multiplexing, beamforming, and transmit diversity. Spatial multiplexing may be used to transmit different streams of data simultaneously on the same frequency. The data streams may be transmitted to a single UE 102 to increase the data rate or to multiple UEs 102 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 102 with different spatial signatures, which enables each of the UE(s) 102 to recover the one or more data streams destined for that UE 102. On the UL, each UE 102 transmits a spatially precoded data stream, which enables the RAN node 106 to identify the source of each spatially pre-coded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, some aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a discrete Fourier transform (DFT)-spread OFDM signal to compensate for high peak-to-average power ratio (PAPR).

Figure 3:
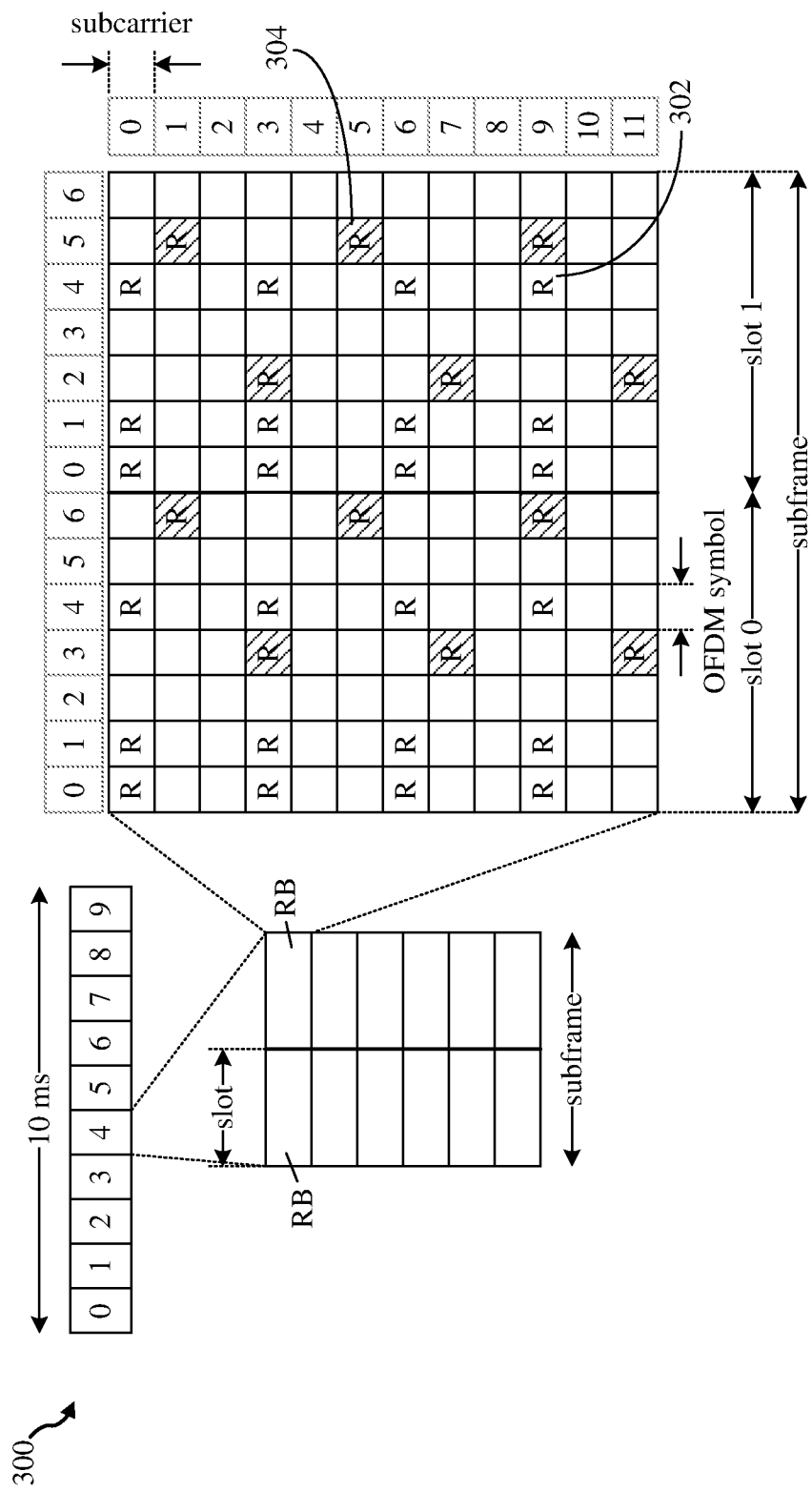
FIG. 3 is a diagram illustrating an example of a downlink (DL) frame structure in an EPS network according to some embodiments of the present disclosure.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
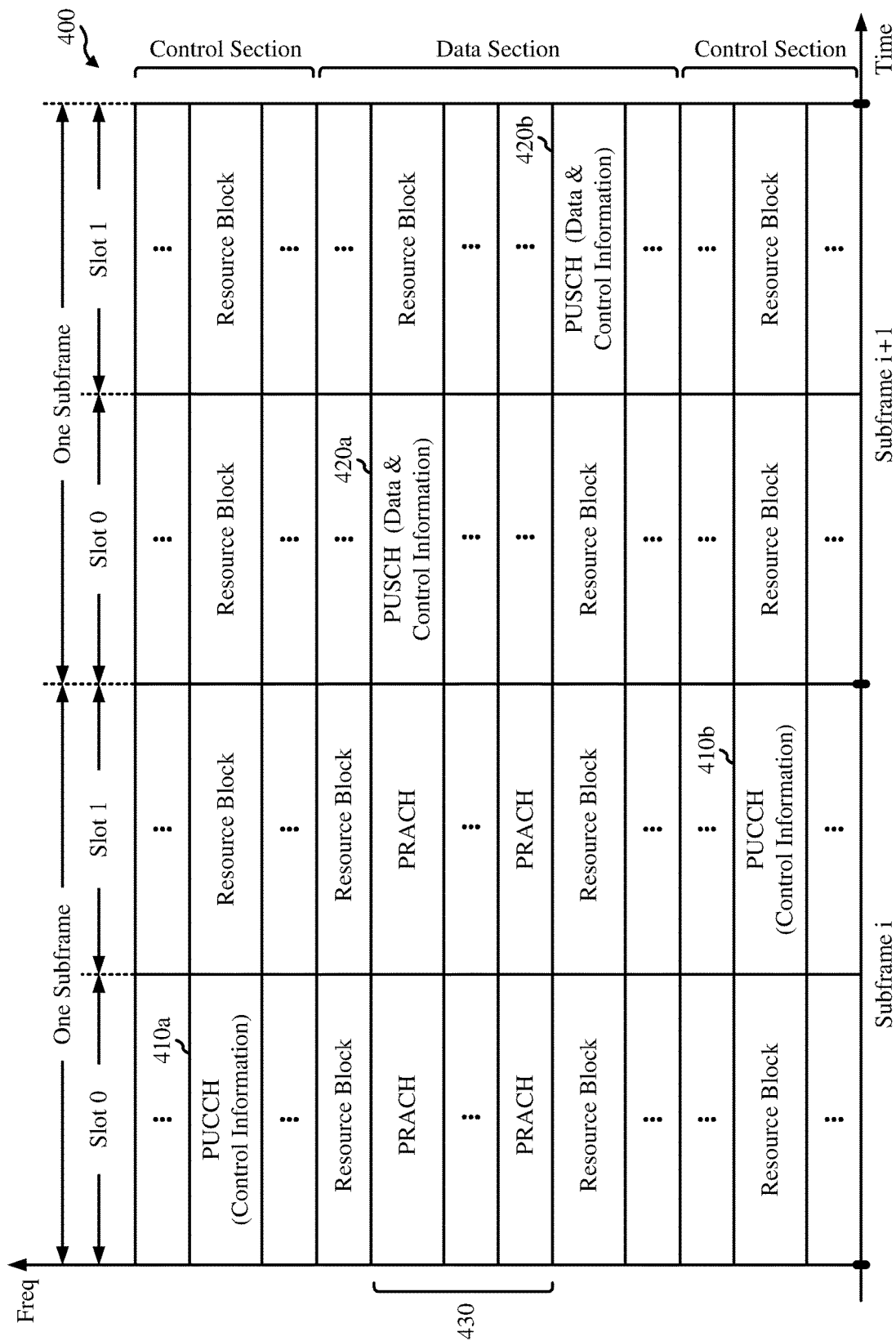
FIG. 4 is a diagram illustrating an example of an uplink (UL) frame structure in the EPS network according to some embodiments of the present disclosure.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to a RAN node. The UE may also be assigned resource blocks 420*a*, 420*b* in the data section to transmit data to the RAN node. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
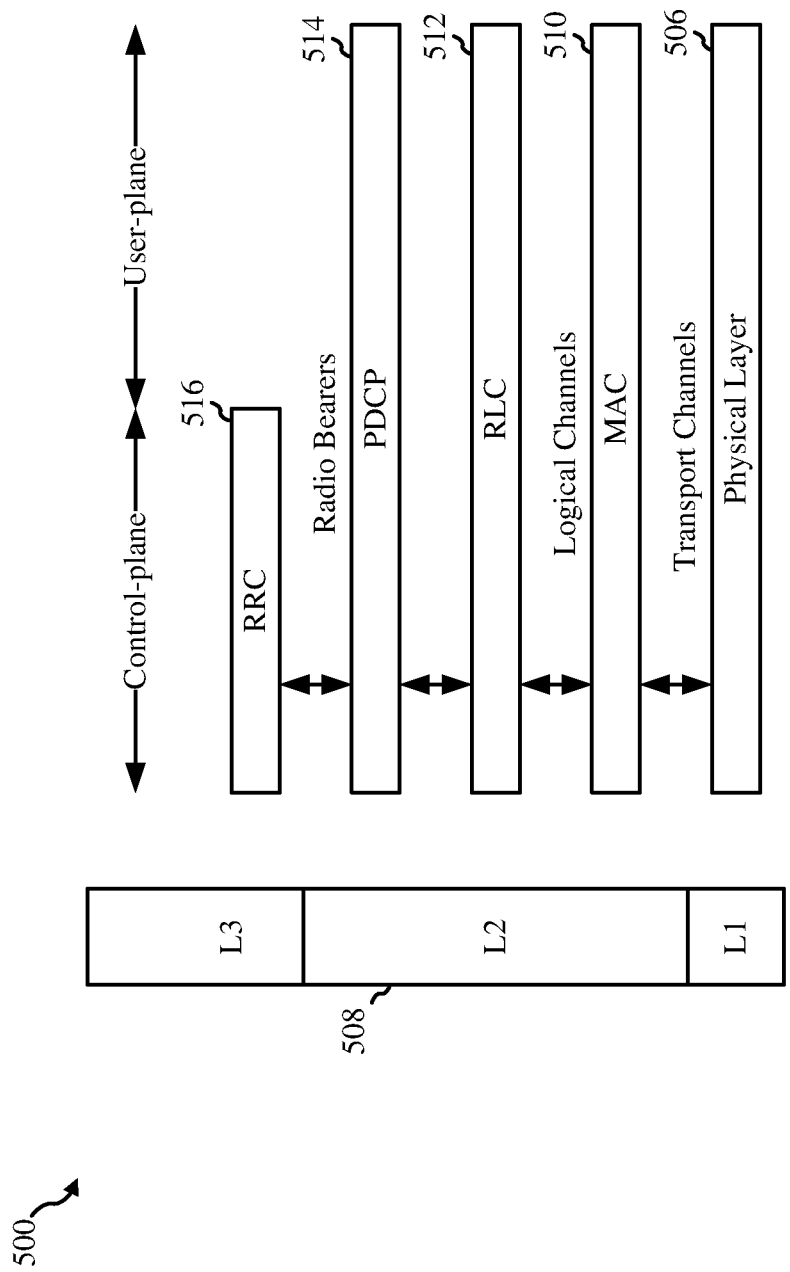
FIG. 5 is a diagram illustrating an example of a radio protocol architecture for the user and control planes according to some embodiments of the present disclosure.

FIG. 5 is a diagram 500 illustrating an example of a radio protocol architecture for the user and control planes in LTE. The radio protocol architecture for the UE and the RAN node is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and RAN node over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the RAN node on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between RAN nodes. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and RAN node is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the RAN node and the UE.

Figure 6:
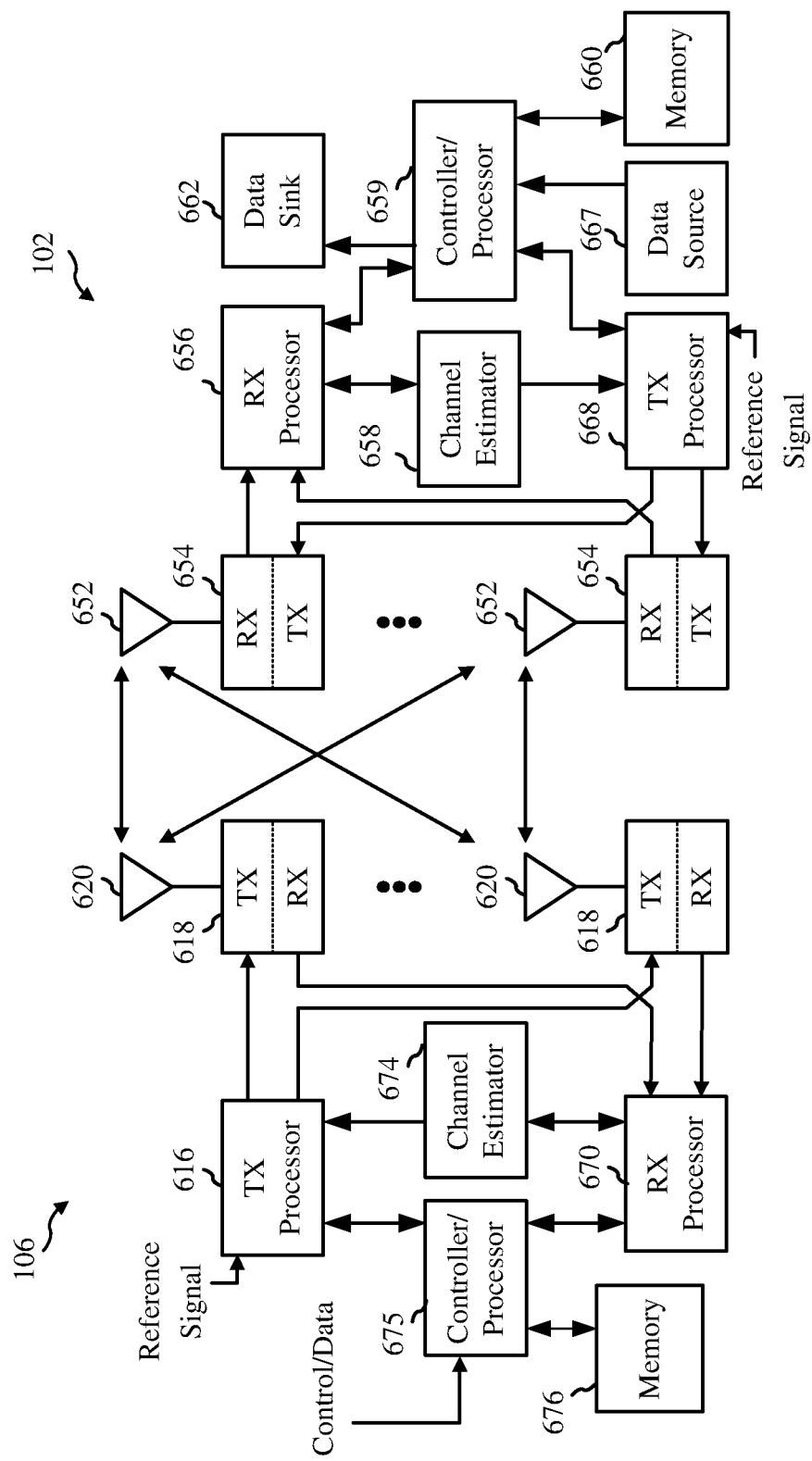
FIG. 6 is a diagram illustrating an example of a radio access network (RAN) node and user equipment (UE) in an access network according to some embodiments of the present disclosure.

FIG. 6 is a block diagram of a RAN node 106 in communication with a UE 102 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 102 based on various priority metrics. The controller/processor 675 is also responsible for HARQ operations, retransmission of lost packets, and signaling to the UE 102.

The transmit (TX) processor 616 implements various signal processing functions for the L1 layer (i.e., physical layer). The signal processing functions include coding and interleaving to facilitate forward error correction (FEC) at the UE 102 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams Channel estimates from a channel estimator 674 may be used to determine the coding and modulation scheme, as well as for spatial processing. The channel estimate may be derived from a reference signal and/or channel condition feedback transmitted by the UE 102. Each spatial stream may then be provided to a different antenna 620 via a separate transmitter 618TX. Each transmitter 618TX may modulate an RF carrier with a respective spatial stream for transmission.

At the UE 102, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 102. If multiple spatial streams are destined for the UE 102, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the RAN node 106. These soft decisions may be based on channel estimates computed by the channel estimator 658. The soft decisions are then decoded and deinterleaved to recover the data and control signals that were originally transmitted by the RAN node 106 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the RAN node 106, the controller/processor 659 implements the L2 layer for the user plane and the control plane by providing header compression, ciphering, packet segmentation and reordering, and multiplexing between logical and transport channels based on radio resource allocations by the RAN node 106. The controller/processor 659 is also responsible for HARQ operations, retransmission of lost packets, and signaling to the RAN node 106.

Channel estimates derived by a channel estimator 658 from a reference signal or feedback transmitted by the RAN node 106 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the RAN node 106 in a manner similar to that described in connection with the receiver function at the UE 102. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 102. Upper layer packets from the controller/processor 675 may be provided to the core network. The controller/processor 675 is also responsible for error detection using an ACK and/or NACK protocol to support HARQ operations.

Figure 7:
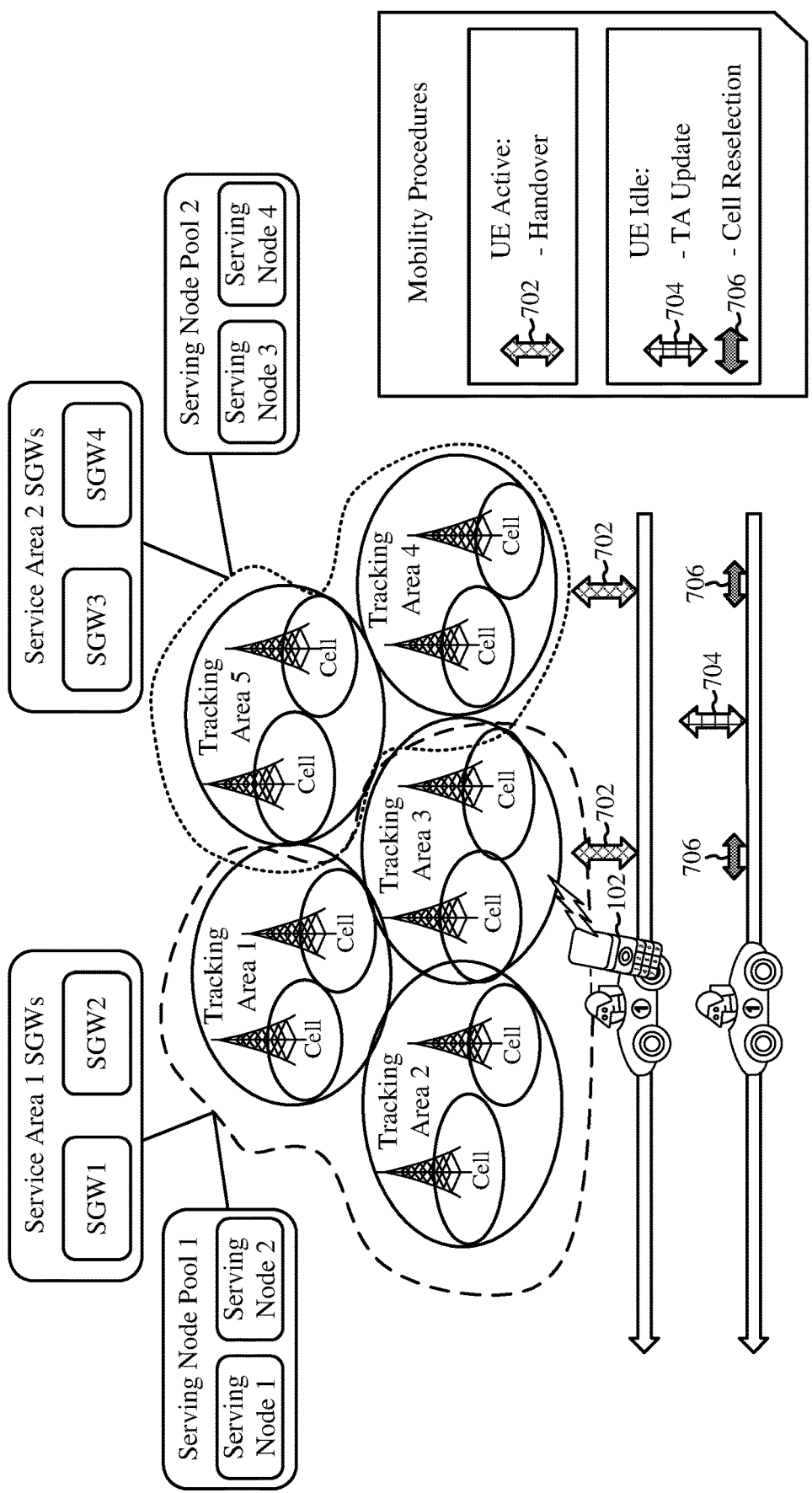
FIG. 7 is a diagram illustrating an example of a network topology for the EPS network according to some embodiments of the present disclosure.

FIG. 7 illustrates the network topology of an EPS network. In particular, FIG. 7 illustrates certain aspects of mobility procedures within the EPS network. The EPS network may include various cells, which may be served by various RAN nodes (e.g., eNBs). The EPS network may also include various serving nodes (e.g., MMEs). The EPS network may also include various SGWs, which may be grouped into one or more service areas. For example, Service Area 1 may include SGW 1 and SGW2 as well as serving node pool 1, which includes serving node 1 and serving node 2. Service Area 2 may include SGW1 and SGW 2 as well as serving node pool 2, which includes serving node 3 and serving node 4. Each service area may include one or more tracking areas (TAs). For example, Service Area 1 may include Tracking Area 1, Tracking Area 2, and Tracking Area 3. Service Area 2 may include Tracking Area 4 and Tracking Area 5. Each tracking area may include one or more RAN nodes. The UE 102 may be in an active mode or an idle mode. In the active mode, the UE 102 may perform a handover 702 as the UE 102. In the idle mode, the UE 102 may perform cell reselection 706 and/or a TA update 704. One or ordinary skill in the art will understand that the EPS network may include any number of tracking areas, cells, SGWs, serving node pools, serving nodes, and/or RAN nodes may be implemented without deviating from the scope of the present disclosure. For example, multiple serving nodes may be included in the service area of the same serving node pool. The service areas of various serving nodes and/or MMEs may overlap with each other.

A UE 102 may roam without having to change the serving node. A service area may be served by one or more serving nodes in parallel. In existing LTE and EPS networks, as additional functionality for a serving node has been defined in successive releases, the serving node has become more complex over time. In such networks, serving node selection is performed predominantly for load balancing and RAN sharing. Such networks feature defined serving node pools and serving node selection is based on the device's identifier (e.g., a Globally Unique Temporary Identifier (GUTI)).

Figure 8:
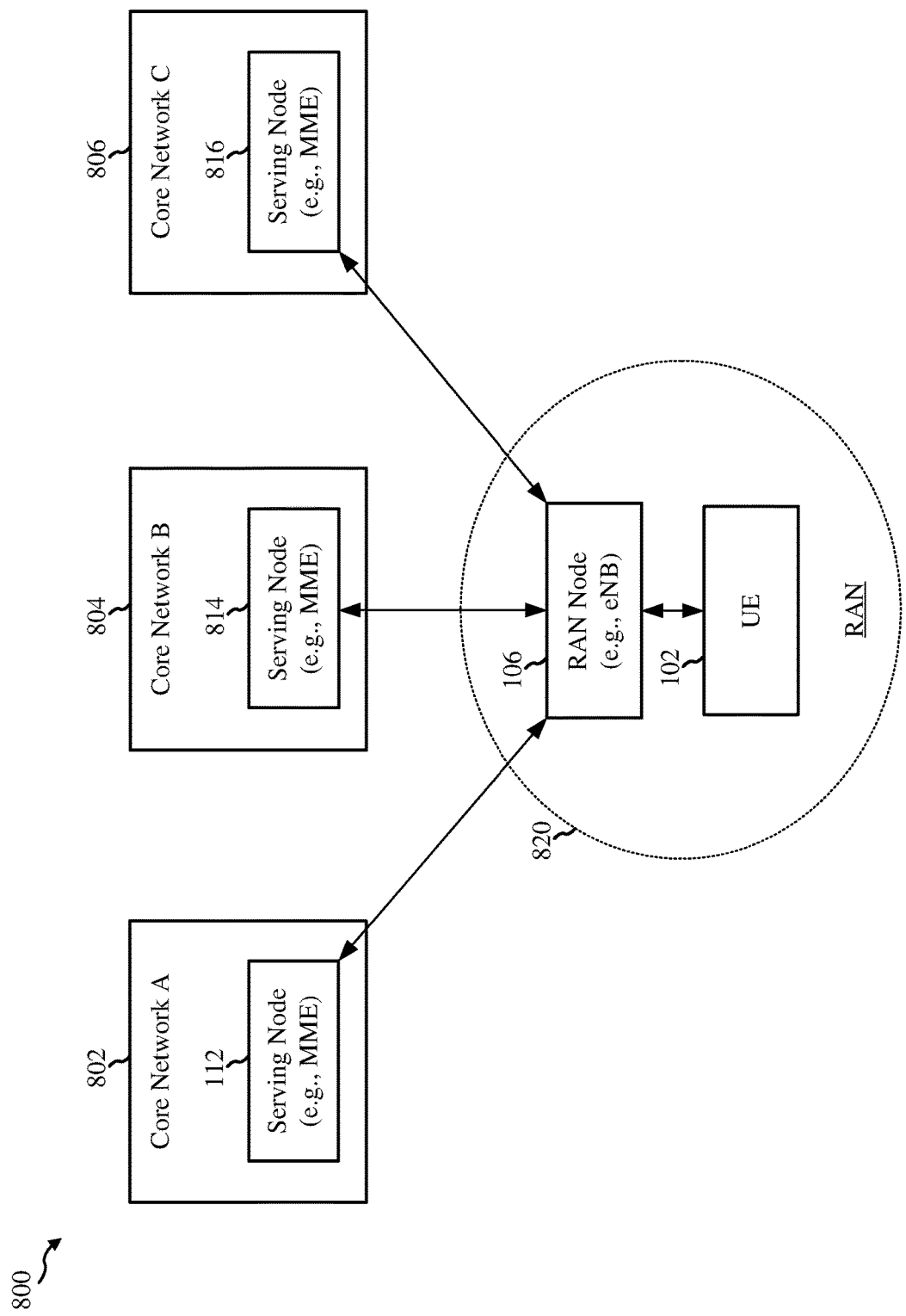
FIG. 8 is a diagram illustrating an example of a network architecture according to some embodiments of the present disclosure.

FIG. 8 illustrates an exemplary network architecture 800 including a UE 102, a RAN node 106, and various serving nodes 112, 814, 816. As described in greater detail above, a non-limiting example of the RAN node 106 is an eNB, and a non-limiting example of the serving nodes 112, 814, 816 are various MMEs. The UE 102 may perform various communications in a particular RAN 820. The UE 102 in the RAN 820 may communicate with the RAN node 106. The UE 102 may communicate with various other RAN nodes (e.g., other RAN nodes 108) without deviating from the scope of the present disclosure. The RAN node 106 may communicate with one or more serving nodes 112, 814, 816. A serving node may be a part of a core network (CN). For example, the serving node 112 may be a part of Core Network A 802, another serving node 814 may be a part of Core Network B 804, and yet another serving node 816 may be a part of Core Network C 806. One of ordinary skill in the art will understand that the network architecture 800 may include various other components not illustrated in FIG. 8 without deviating from the scope of the present disclosure.

Conventional Initial Connection Establishment and Serving Node Selection

Figure 9:
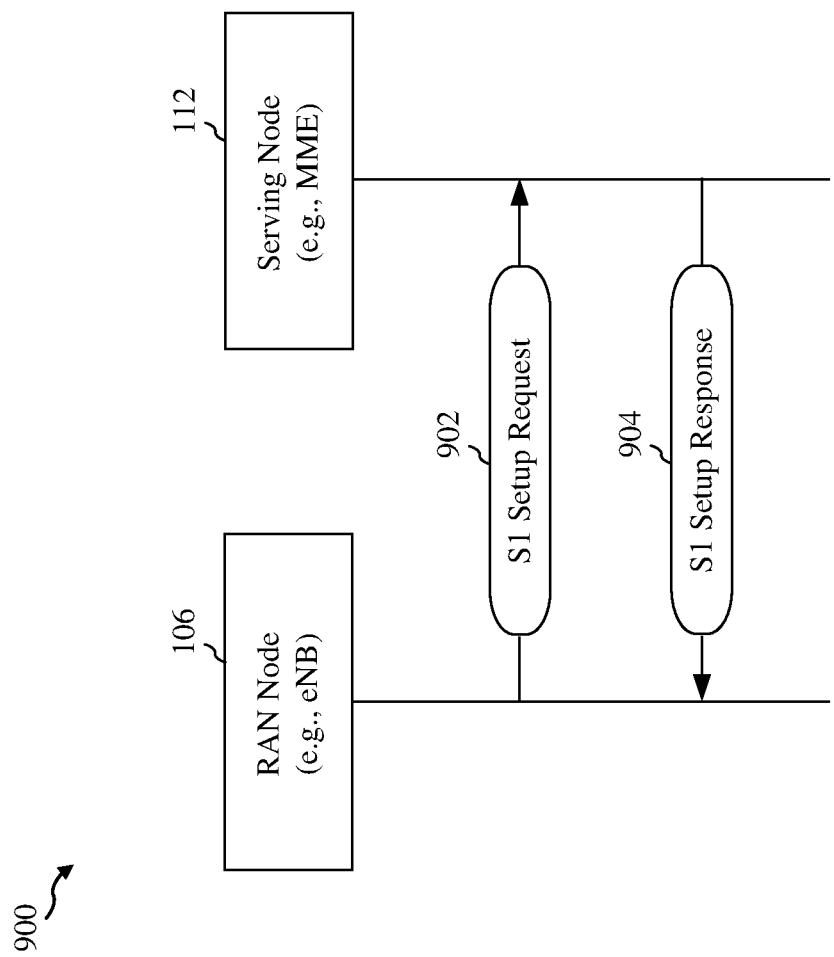
FIG. 9 is a diagram illustrating an example of communication establishment between a RAN node and a serving node according to some embodiments of the present disclosure.

FIG. 9 is a diagram 900 illustrating the initial establishment of a communication interface between the RAN node 106 (e.g., eNB) and the serving node 112 (e.g., MME). Communication between the RAN node 106 and the serving node 112 is accomplished through a signaling interface, such as an S1-MME interface in LTE standards. During the initial establishment of the communication interface between the RAN node 106 and the serving node 112, the RAN node 106 may transmit an S1 setup request 902 to the serving node 112. After receiving the S1 setup request 902, the serving node 112 may transmit an S1 setup response 904 to the RAN node 106. Such a signaling interface may be established when the RAN node 106 and the serving node 112 connect to each other during initial provisioning. Broadly, the purpose of such a signaling interface setup procedure is to exchange application-level data needed for the RAN node 106 and the serving node 112 to correctly interoperate on the signaling interface. Such a signaling interface setup procedure may erase some existing application-level configuration data in the RAN node 106 and the serving node 112 and replace that existing application-level configuration data with the application-level configuration data received. As part of the signaling interface setup, the RAN node 106 may be configured with a relative capacity information element (IE) for each serving node in the pool. Accordingly, the probability of the RAN node 106 selecting a particular serving node (e.g., serving node 112) within that serving node pool is proportional to its relative capacity. The relative capacity is typically set according to the capacity of a serving node relative to other serving nodes, and generally does not change frequently.

Conventional UE Connection Establishment and Serving Node Reselection

When a UE 102 arrives at the RAN node 106 and attempts to connect or attach to the RAN node 106, the UE 102 may send a connection request message configured to request establishment of a connection to the RAN node 106. Such a message may be referred to as an attach request 1002. Such a message may be transmitted to the RAN node 106. If the UE 102 has registered with a serving node 112 (e.g., an MME), then the UE 102 provides to the RAN node 106 a temporary identifier that is globally unique (e.g., a GUTI). The identifier may provide an unambiguous identification of the UE 102 and allow the identification of the serving node 112 and the network. Such an identifier may be used by the network and the UE 102 to establish the UE's identity during signaling between the UE 102 and the network. The identifier may include two components: a first component that uniquely identifies a serving node 112 that allocated the identifier, and a second component that uniquely identifies the UE 102 within the serving node 112 that allocated the identifier.

The identifier may include a globally unique serving node identifier (e.g. a Globally Unique Mobility Management Entity Identifier (GUMMEI) when the serving node 112 is an MME) and a serving node temporary mobile subscriber identity (e.g., a Temporary Mobile Subscriber Identity (TMSI)). The GUMMEI may include a mobile country code (MCC) identifying the country of domicile of the mobile subscriber, a mobile network code (MNC) identifying the home Public Land Mobile Network (PLMN) of the mobile subscriber, an MME group ID (MMEGI), and an MME Code (MMEC).

If the UE 102 is not yet registered with any serving node 112, then the UE 102 does not provide information as a registered serving node entity to be forwarded by the RAN node 106 to the serving node 112. At this stage, the RAN node 106 may perform serving node selection for the UE 102. The RAN node 106 selects the serving node 112 for the UE 102 based on the relative capacity IE, as described in greater detail above. A load balancing function is performed based on the relative capacity of the serving nodes. Load balancing directs UEs entering a serving node pool to a suitable serving node in a manner that achieves load balancing between serving nodes.

In some existing networks, during connection establishment signaling (e.g. radio resource control (RRC) signaling) between the UE 102 and the RAN node 106, the UE 102 provides to the RAN node 106 a certain establishment cause IE. Among other things, the establishment cause IE includes parameters that indicate what the connection will be used for, such as for an emergency call, for mobile-terminated access, for mobile-originated signaling or data, etc. Accordingly, the RAN node 106 can determine whether or not the UE 102 is configured for low access priority based on information received in connection establishment signaling and can utilize this information for serving node selection. However, this information still lacks an indication about the UE 102 itself, such as a device type or services operating at the UE 102, which can better improve serving node selection.

Once the RAN node 106 has selected the serving node 112, the RAN node 106 transmits an initial UE message to the selected serving node 112. That is, over the signaling interface (e.g., an S1-MME interface), the RAN node 106 transmits the initial UE message to transfer information corresponding to the UE's connection request message to the serving node 112. This message may include a NAS message (e.g., an attach request message), the UE signaling reference ID, and other S1 (i.e., signaling interface) addressing information. The serving node 112 may utilize the identifier in the initial UE message to determine if the serving node 112 has an existing UE context. The serving node 112 begins to create a UE context by storing the UE network capability information, a Packet Data Network (PDN) connectivity request, etc., which are used later during security activation and bearer establishment. The serving node 112 replies to the RAN node 106 with an NAS Attach Accept message. The RAN node 106 may then transfer a message with the NAS Attach Accept received from the serving node to the UE 102 (unless this message is transferred to the UE 102 another way). When the UE 102 moves away from the selected serving node's service area, the selected serving node performs serving node selection on behalf of the UE 102.

Enhanced Initial Connection Establishment and Serving Node Selection

According to some aspects of the present disclosure, the setup procedure for establishing a new signaling interface (e.g., an S1-MME connection) between a RAN node 106 and a serving node 112 may be modified or enhanced to include one or more additional information elements. For example, referring to FIG. 9, in some aspects of the present disclosure, the S1 setup request from the RAN node 106 to the serving node 112 may indicate information about the RAN node 106 supporting different technologies (e.g., different RATs, different UE device types, and/or different UE services, etc.), which may be useful for a serving node 112. For example, in response to a signaling interface setup request, the serving node 112 may provide the RAN node 106 with information relating to serving node's capabilities, including but not limited to a supported device type list, a supported services list, an initial device identifier prefix list, and/or a radio access technology (RAT) list.

Table 1 below provides some non-limiting examples of such parameters as may be included in a serving node S1 setup response message.

TABLE 1

| IE/Group Name | Semantics Description |
|---|---|
| Device type list | Enumerated list of device types supported by the serving node |
| Services list | Enumerated list of services supported by the serving node |
| Initial device identifier prefix list | Enumerated list of device identifier prefixes supported by the serving node, i.e., the RAN node may select this serving node for devices with an initial identifier in this list |
| RAT list | Enumerated list of RATs supported for access by the serving node |

Table 1 (above) lists some non-limiting examples of various parameters, one or more of which may be communicated from the serving node 112 to the RAN node 106 in some aspects of the present disclosure. The device type list may be an enumerated list of the device types that the serving node 112 supports, and the services list may be an enumerated list of services that the serving node 112 supports.

Some non-limiting examples of services supported by the UE 102 include a data service, a voice service, a video service, an Internet service, and any other suitable service operable on the UE 102. The initial device identifier prefix list may be an enumerated list of device identifier prefixes that the serving node 112 supports. The RAN node 106 may select this serving node 112 for devices or UEs 102 that have an initial identifier that appears in this list. The RAT list may be an enumerated list of RATs supported for access by the serving node 112. That is, a particular serving node 112 might not only serve different device types; in some aspects of the present disclosure, different serving nodes may also serve different RATs. For example, one serving node may serve fifth-generation (5G) devices and fourth-generation (4G) devices, while another serving node may only serve Wireless Local Area Network (WLAN) devices. Thus, a RAT list provided by the serving node can assist in serving node selection. Such parameters, in addition to one or more other parameters corresponding to the serving node 112 (e.g., the relative capacity IE) may be provided from the serving node 112 to the RAN node 106 in the S1 setup response 904. In this way, the RAN node 106 may store in its memory these parameters regarding the serving node 112. Such parameters may be utilized upon connection with the UE 102 for serving node selection.

In some aspects of the present disclosure, the S1 setup response message 904 transmitted from the serving node 112 to the RAN node 106 may include one or more device identifier prefixes supported by the serving node 112. That is, the UE 102 may implicitly indicate its device type by means of a portion of its device identifier. Here, by storing a list of supported device identifier prefixes for the serving node 112, the RAN node 106 may select this serving node 112 for UEs that indicate an identifier within such a list. In some other aspects of the present disclosure, in addition or alternative to the S1 setup response message 904, the serving node 112 parameters described above may be provided to the RAN node 106 utilizing operation and maintenance (OAM) configuration messaging. That is, the parameters listed in Table 1 (above) may be included in one or both of the S1 setup response 904 and/or the OAM signaling in some configurations of the present disclosure.

Enhanced UE Connection Establishment

Figure 10:
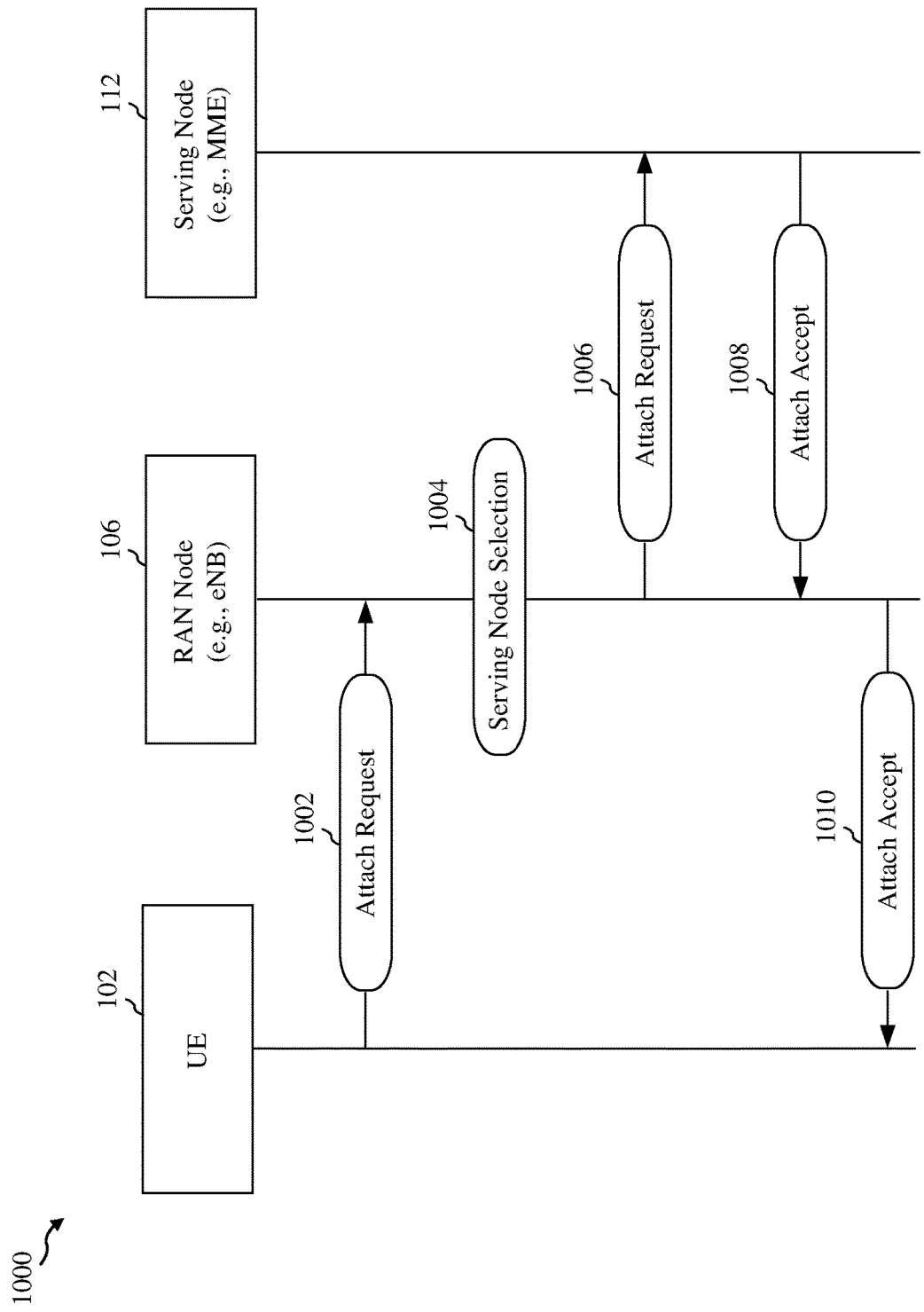
FIG. 10 is a diagram illustrating an example of communication establishment between a UE and various components of a network according to some embodiments of the present disclosure.

FIG. 10 is a diagram 1000 illustrating an initial connection establishment procedure between the UE 102 and the EPS network according to some aspects of the present disclosure. The UE 102 may select a core network from among a plurality of core networks or virtualized core networks, e.g., in accordance with a network identifier, such as the PLMN-ID. Prior to attempting to attach to a particular RAN node 106, the UE 102 may initially determine the RAN node 106 to which it wishes to attach. According to some aspects of the present disclosure, the UE 102 may be enabled to determine whether the RAN node 106 has a signaling interface (e.g., an S1-MME interface) with serving nodes that are capable of supporting the device type and/or services corresponding to that UE 102. For example, the RAN node 106 may be configured to broadcast a message or messages indicating information relating to serving nodes 112 associated with that RAN node 106. Here, these broadcasts may include information from Table 1 (above). For example such information may include a device type list, a services list, an initial device identifier prefix list, and/or a RAT list. Accordingly, the UE 102 may utilize such information (in addition to existing mechanisms for selecting the RAN node 106) to determine whether to attempt to attach to that RAN node 106.

As another example, the UE 102 may be configured with a list of RAN nodes 106. The UE 102 may utilize suitable identifiers for the RAN nodes 106. Non-limiting examples of such identifiers include PLMN-IDs, tracking area code, and/or a cell-ID, where support for device type(s) corresponding to the UE 102 is available. Accordingly, in some configurations, the UE 102 may be configured to attempt to attach to specific cells according to its list of RAN nodes 106. In some configurations, the device type of the UE 102 may be related to the services running on the UE 102. For example, the UE 102 may be a washing machine that connects to a network. The washing machine may indicate that it is an Internet-of-everything (IOE) device, and the services it runs relate to that device type (e.g., washing machine-related services). However, in some other configurations, the device type of the UE may be unrelated to the services running on the UE 102. That is, a particular device type does not necessarily imply a particular type of service. For example, the UE 102 may be a tablet computer. The tablet computer may connect the network, but the tablet may run multiple, different services (e.g., voice, Internet, data, video, etc.).

When the UE 102 does attempt to attach to the RAN node 106, the UE 102 may transmit a connection request message. A non-limiting example of the connection request message is an attach request 1002. However, according to some aspects of the present disclosure, the attach request 1002 transmitted from the UE 102 to the RAN node 106 may include information that the RAN node 106 may utilize for serving node selection. For example, the attach request 1002 may include a UE's device ID or other suitable identifier, one or more device type(s) corresponding to the UE 102, one or more service(s) that may be utilized by the UE 102. For example, the UE 102 may transmit an attach request 1002 that includes a 'service profile' of the UE 102. The service profile may be configured to indicate one or more of a device type of the UE 102 and/or one or more services operational at the UE 102. In some aspects of the present disclosure, the device type indication from the UE 102 to the RAN node 106 for serving node selection by the RAN node 106 may be explicit and/or implicit.

With regard to an implicit indication of the UE's device type, the RAN node 106 may select a serving node 112 for the UE 102 in accordance with the indication of a UE identifier. An identifier signaled by the UE 102 and utilized for serving node selection may be any suitable identifier, including but not limited to the UE's International Mobile Subscriber Identity (IMSI) or a Medium Access Control Identifier (MAC-ID) of the UE 102. For example, the identifier may be defined to include information relating to the UE's device type. The UE's identifier may be utilized by the RAN node 106 to select the serving node 112 based on, for example, an IMSI prefix match. A list of IMSI prefix matches may be provided from the serving node 112 to the RAN node 106 by utilizing an OAM configuration or during the S1 setup signaling. Explicit serving node selection may exist when the UE 102 explicitly indicates the device type and/or the services of the UE 102 required to be supported by the serving node 112 in the initial NAS message from the UE 102 when the connection is established. In some aspects of the present disclosure, the information configured to indicate that the UE's service profile may only be included in the attach request 1002 when the UE 102 is not already attached to the network. That is, the device type information may only be included in an initial attach message but not in subsequent connection establishment signaling.

In some aspects of the present disclosure, the UE 102 may have multiple device types. Such a UE 102 may perform a separate attach procedure for each device type, thereby resulting in separate connections (e.g., one connection per device type). For example, a smart phone may be configured to connect to a serving node 112 for phone services. The smart phone may establish another connection for video player services. The smart phone may establish yet another connection for low-power services, such as a connection configured for sending logs.

The service types and the access point names (APNs) may be configured in various configurations without deviating from the scope of the present disclosure. In some configurations, a particular service may map to one or more associated APNs (e.g., Internet APN, voice APN, data APN, etc.). For example, a particular application running on the UE 102 may utilize the voice APN and the data APN. In some configurations, one or more applications may map to a single APN. For example, a video application and an Internet-browsing application running on the UE 102 may both map to the Internet APN. In some configurations, a particular APN may be deactivated if no services are active for that particular APN. For example, if a voice-related application maps to a data APN, and the user is not currently on a voice call, then the data APN may be deactivated. APNs may be activated and deactivated based on the active services utilizing that APN. In some configurations, some services may map to their own dedicated APN(s). For example, operator voice services may utilize their own dedicated APN(s).

At block 1004, the RAN node 106 may select the serving node 112. The RAN node 106 may determine the set of serving nodes 112 capable of handling the device type(s) and/or service(s) corresponding to the UE 102. This information from the serving node 112 to the RAN node 106 may be stored in a memory at the RAN node 106 and may be provided from the serving node 112 to the RAN node 106 utilizing OAM configuration signaling and/or S1 setup procedure signaling. The RAN node 106 may accordingly select a specific serving node 112 from the set based on such parameters as well as the relative capacity IE to facilitate load balancing across various serving nodes. In some aspects of the present disclosure, the serving node 112 may assign a GUTI to the UE 102. The assigned GUTI may be a function of the device type and/or the services or subscription profile of the UE 102. After the RAN node 106 selects the serving node 112, the RAN node 106 may transmit an attach request 1006 to the serving node 112. After receiving the attach request 1006, the serving node 112 may transmit an attach accept 1008 to the RAN node 106. In response, the RAN node 106 may transmit an attach accept 1010 to the UE 102.

If a serving node (e.g., serving node 112) is to be selected according to a particular device type of the UE 102, then the selected serving node (e.g., serving node 112) should generally be capable of handling all of the services associated with that device type. For example, the UE 102 may be a smartphone. If the smartphone connects to the serving node 112, then that serving node 112 should generally be capable of handling all (e.g., up to tens or hundreds of) services that the smartphone may implement. If the smartphone activates a service that is currently un available or unsupported at the selected serving node 112, then the serving node 112 may perform serving node reselection to another serving node that supports that particular service, as described in greater detail below.

Enhanced Serving Node Reselection

Figure 11:
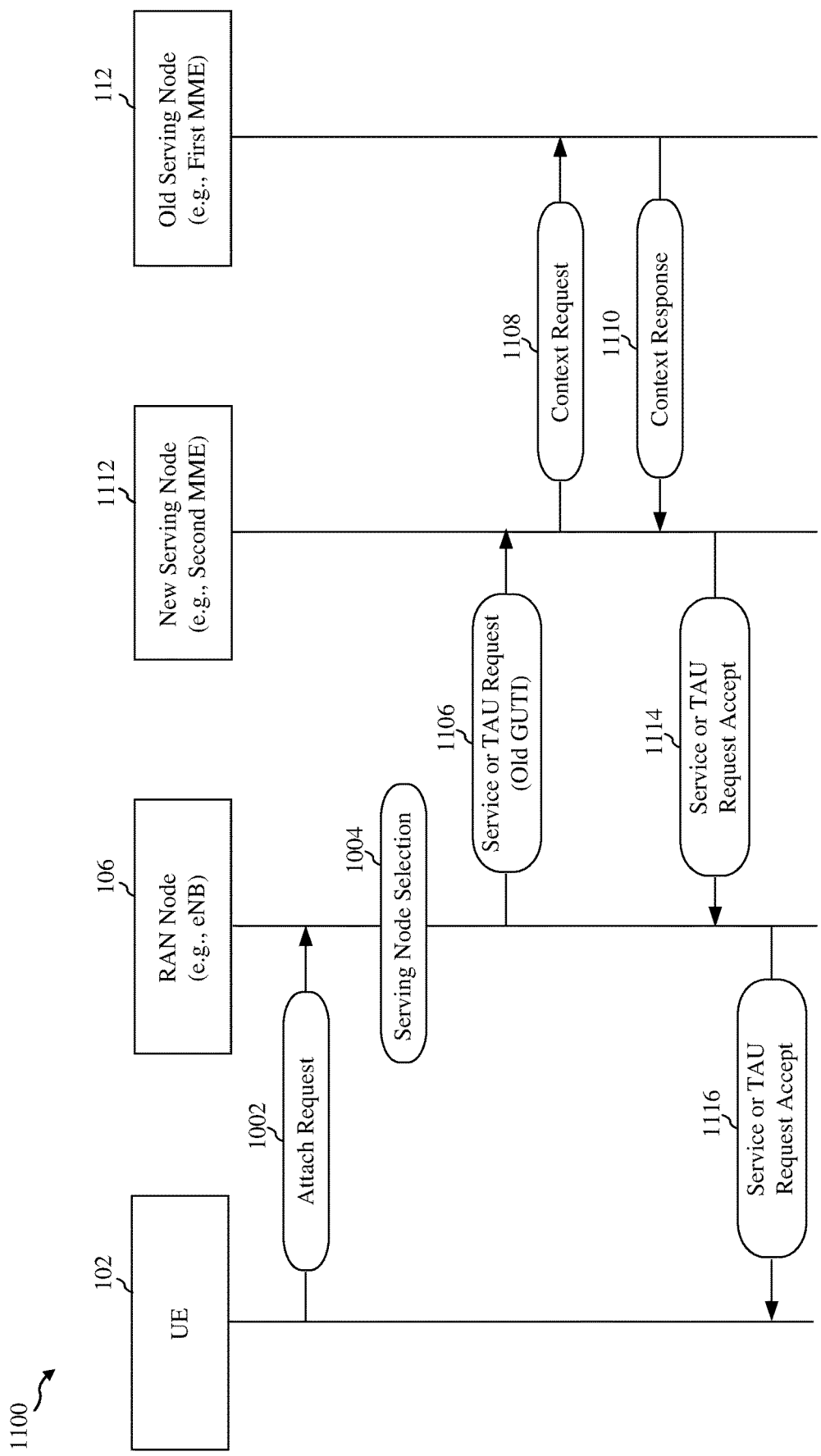
FIG. 11 is a diagram illustrating an example of serving node reselection according to some embodiments of the present disclosure.

FIG. 11 is a diagram 1100 illustrating a serving node reselection procedure according to some aspects of the present disclosure. As described in greater detail above, the selected serving node (e.g., serving node 112) should be capable of handling all of the services associated with the UE's device type. If the UE 102 attempts to activate a service currently unavailable or unsupported by the current serving node, then the serving node 112 may perform serving node reselection (e.g., reselection to another serving node 1112). The RAN node 106 may utilize the UE's device type and/or signaled services to select target RAN nodes 106 for handover of the UE 102. In some configurations, the selected device types and/or services of the UE 102 may be provided by the UE 102 during RRC signaling. In some configurations, the selected device types and/or services of the UE 102 may be provided by the serving node 112 and/or source RAN node 106 at an S1/X2 handover to select target cells for future handovers. For example, the RAN node 106 may exchange the device types and/or services available from its connected serving nodes as part of an X2 setup procedure. Generally, the X2 setup procedure sets up an X2 interface between various RAN nodes 106 (e.g., eNBs). As such, when a connected UE 102 is preparing for handover, the RAN node 106 can limit the set of candidate RAN nodes 106 to cells connected to serving nodes that support that UE's device type and/or services. As described in greater detail above, the UE 102 may transmit an attach request message 1002 to the RAN node 106. Subsequently, at block 1004, the RAN node 106 may perform serving node selection. Detailed description pertaining to such steps is provided above with reference to FIG. 10 and therefore will not be repeated.

Various circumstances may trigger a serving node reselection procedure. In some circumstances, after the UE 102 is connected to the serving RAN node 106, the UE 102 may indicate one or more new services and/or indicate a new or different device type to the RAN node 106. If the currently connected serving node 112 does not support such indicated service(s) and/or device type(s) of the UE 102, serving node reselection may occur in such circumstances. In some other circumstances, the UE 102 having an existing serving node connection may move in location. Because of the move in location, the UE 102 may change its tracking area and/or move out of the service area of its selected serving node 112. In such circumstances, serving node reselection may be occur.

According to some aspects of the disclosure, the UE 102 may transmit certain information to the RAN node 106, such as a service or tracking area update (TAU) request. Such a transmission may include suitable information for serving node selection as described in greater detail above. Such information may include, but is not limited to, a device ID, one or more device type(s), and/or one or more service(s) utilized by the UE 102. The RAN node may perform the serving node selection procedure, as described in greater detail above. The RAN node 106 may check the device type(s) and/or service(s) to ensure they are supported by the existing serving node 112 indicated in the device ID. If the device type(s) and/or service(s) are supported by the existing serving node 112 indicated (e.g., by the UE's GUTI), then the RAN node 106 may forward the request to the current serving node 112.

If the device type(s) and/or service(s) of the UE 102 is unsupported by the existing serving node 112, the RAN node 106 may determine to select a new serving node 1112. As described above, the RAN node 106 may consult information stored in its memory as received from the serving nodes 112, 1112 to find a suitable serving node 1112 for the UE 102. The set of serving nodes capable of handling the device type(s) and/or service(s) may be selected from among the serving nodes for which such information has been stored at the RAN node 106. From among this set of serving nodes, the RAN node 106 may then select a specific serving node 1112 based on the relative capacity IE to achieve load balancing among the serving nodes.

To select a new serving node 1112, the RAN node 106 may transmit a service or TAI request 1106 to the new serving node 1112. Subsequently, the new serving node 1112 may transmit a context request 1108 to the existing (e.g., "old") serving node 112, which in response may transmit a context response 1110 to the new serving node 1112. In response to receiving the context response 1110, the new serving node 1112 may transmit a service or TAU response accept 1114 to the RAN node 106, which will forward a service or TAI response accept 1116 to the UE 102. Accordingly, the newly selected serving node 1112 may retrieve the UE 102 context from the existing serving node 112 based on the GUTI. The new serving node 1112 may further select and assign a new GUTI to the UE 102. The new serving node 1112 may assign a GUTI that is a function of the device type(s), service(s), and/or subscription profile of the UE 102.

Various Methods and/or Processes Operable at the UE

Figure 12:
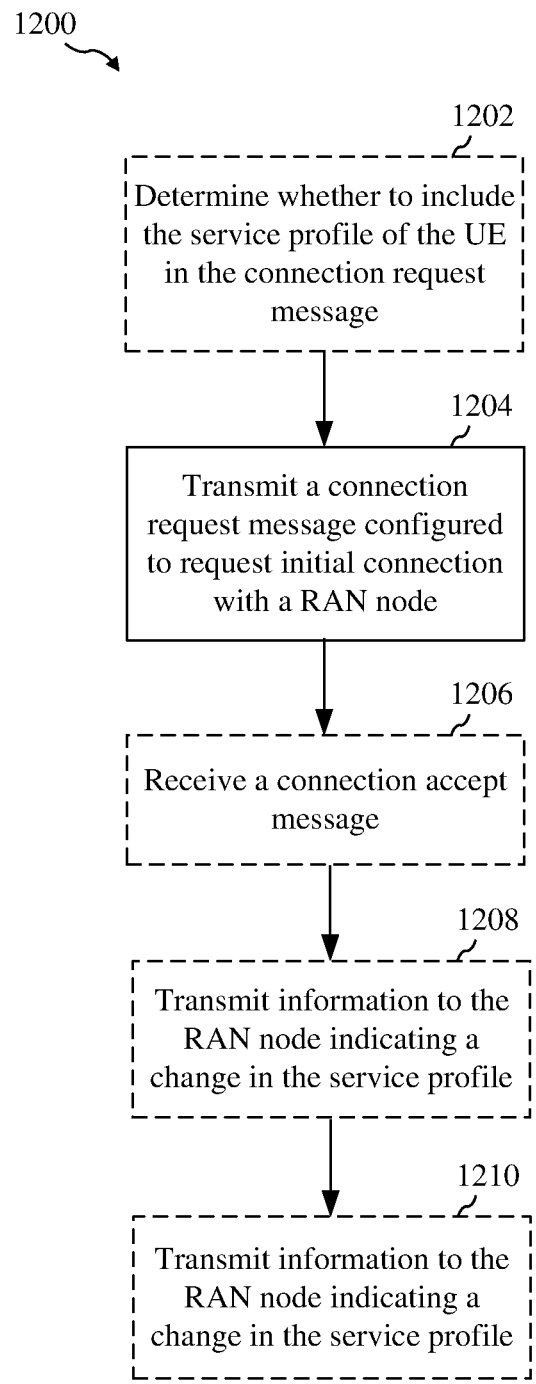
FIG. 12 is a diagram illustrating an example of various methods and/or processes operable at a UE.

FIG. 12 is a diagram 1200 illustrating an example of various methods and/or processes operable at the UE 102. At step 1202, the UE 102 may determine whether to include the service profile of the UE 102 in the connection request message. For example, referring to FIG. 10, the connection request message may be the attach request 1002. Such a determination may be performed according to many configurations without deviating from the scope of the present disclosure. In some configurations, the UE 102 may determine whether to include the service profile of the UE 102 in the connection request message (e.g., attach request 1002) if the UE 102 is not already registered at the network. In some other configurations, the UE 102 may determine whether to include the service profile of the UE 102 in the connection request message (e.g., attach request 1002) if the service profile has changed since the UE 102 last established a connection at the network. In some other configurations, the UE 102 may determine to establish the initial connection with the RAN node 106 in accordance with a determination that the RAN node 106 is associated with at least one of a network identifier, a tracking area code, a cell-ID, or an SSID known to the UE 102 to support the service profile of the UE 102 in accordance with a list of RAN nodes stored in a memory at the UE 102.

Subsequently, at step 1204, the UE 102 may transmit the connection request message (e.g., attach request 1002) configured to request initial connection with the RAN node 106. The connection request message may include information configured to indicate a service profile of the UE 102. The service profile may be configured to indicate one or more of a device type of the UE 102 and/or one or more services operational at the UE 102. As described in greater detail above, the service profile of the UE 102 may include an implicit indication of the device type of the UE 102 and/or explicit information configured to indicate the device type of the UE 102. The device type of the UE 102 may include a voice device, a streaming media device, a web browsing device, a mission-critical device, a low-power device, an Internet device, a sensor device, and/or an IOE device. Additional description pertaining to the service profile, device type, and services operable at the UE 102 are provided above and therefore will not be repeated.

After transmitting the connection request message, at step 1206, the UE 102 may receive a connection accept message. The connection accept message may include information configured to indicate a serving node selected at least in part based on the service profile of the UE 102. For example, referring to FIG. 10, the UE 102 may receive the attach accept 1010 from the RAN node 106, and the attach accept 1010 may include information indicating the serving node selected at least in part based on the service profile of the UE 102.

In some circumstances, the service profile of the UE 102 may change. For example, the UE 102 may have a change in one or more of the device types of the UE 102 and/or one or more services operational at the UE 102. In such circumstances, at step 1208, the UE 102 may transmit information to the RAN node 106 to indicate the change in the service profile. For example, referring to FIG. 11, the device type(s) and/or service(s) of the UE 102 may not be supported by the existing serving node 112. Accordingly, the RAN node 106 may need to determine to select a new serving node 1112. Subsequently, at step 1210, the UE 102 may receive information indicating a change in the selected serving node. The change in the selected serving node may be in accordance with the changed service profile of the UE 102. For example, the information may indicate a change from the serving node 112 to the serving node 1112. The serving node 112 may be changed (to another serving node 1112) because serving node 1112 can accommodate the changed service profile of the UE 102.

Figure 13:
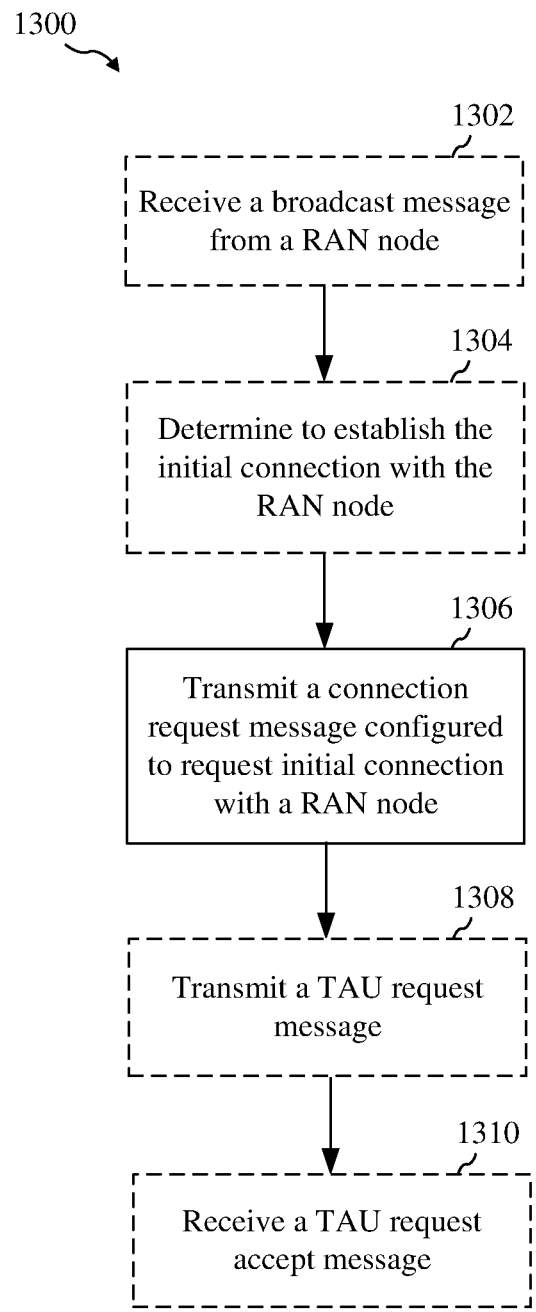
FIG. 13 is a diagram illustrating another example of various methods and/or processes operable at a UE.

FIG. 13 is a diagram 1300 illustrating another example of various other methods and/or processes operable at the UE 102. In some configurations, the service profile of the UE 102 may include the device type of the UE 102. At step 1302, the UE 102 may receive a broadcast message from the RAN node 106. The broadcast message may include information indicating whether at least one serving node associated with the RAN node supports the device type of the UE. For example, referring to FIG. 10, such information may indicate whether at least one of the serving nodes 112, 1112 associated with the RAN node 106 supports the particular device type of the UE 102. At step 1304, the UE 102 may determine to establish the initial connection with the RAN node 106. The UE 102 may determine to establish the initial connection with the RAN node 106 in accordance with the received broadcast message. For example, referring to FIG. 10, the UE 102 may determine to establish the initial connection with the RAN node 106 because at least one of the serving nodes 112, 1112 supports the particular device type of the UE 102.

Subsequently, at step 1306, the UE 102 may transmit the connection request message (e.g., attach request 1002) configured to request initial connection with the RAN node 106. The connection request message may include information configured to indicate a service profile of the UE 102. The service profile may be configured to indicate one or more of a device type of the UE 102 and/or one or more services operational at the UE 102. As described in greater detail above, the service profile of the UE 102 may include an implicit indication of the device type of the UE 102 and/or explicit information configured to indicate the device type of the UE 102. The device type of the UE 102 may include a voice device, a streaming media device, a web browsing device, a mission-critical device, a low-power device, an Internet device, a sensor device, and/or an IOE device. Additional description pertaining to the service profile, device type, and services operable at the UE 102 are provided above and therefore will not be repeated.

In some configurations, at step 1308, the UE 102 may transmit a TAU request message. The TAU request message may include information configured to indicate the service profile of the UE 102. For example, such transmission may include suitable information for serving node selection as described in greater detail above. Such information may include, but is not limited to, a device ID, one or more device type(s), and/or one or more service(s) utilized by the UE 102. As described above with reference to FIG. 11, the RAN node 106 may check the device type(s) and/or service(s) to ensure they are supported by the existing serving node 112 indicated in the device ID. If the device type(s) and/or service(s) are supported by the existing serving node 112 indicated (e.g., by the UE's GUTI), then the RAN node 106 may forward the request to the current serving node 112. To select a new serving node 1112, the RAN node 106 may transmit a service or TAI request 1106 to the new serving node 1112. Subsequently, the new serving node 1112 may transmit a context request 1108 to the existing serving node 112, which in response may transmit a context response 1110 to the new serving node 1112. In response to receiving the context response 1110, the new serving node 1112 may transmit a service or TAU response accept 1114 to the RAN node 106, which will forward a service or TAI response accept 1116 to the UE 102. Accordingly, at step 1310, the UE 102 may receive a TAU request accept message. The TAU request accept message may include information indicating a serving node (e.g., serving node 1112) selected at least in part based on the service profile of the UE 102.

Various Methods and/or Processes Operable at the RAN Node

Figure 14:
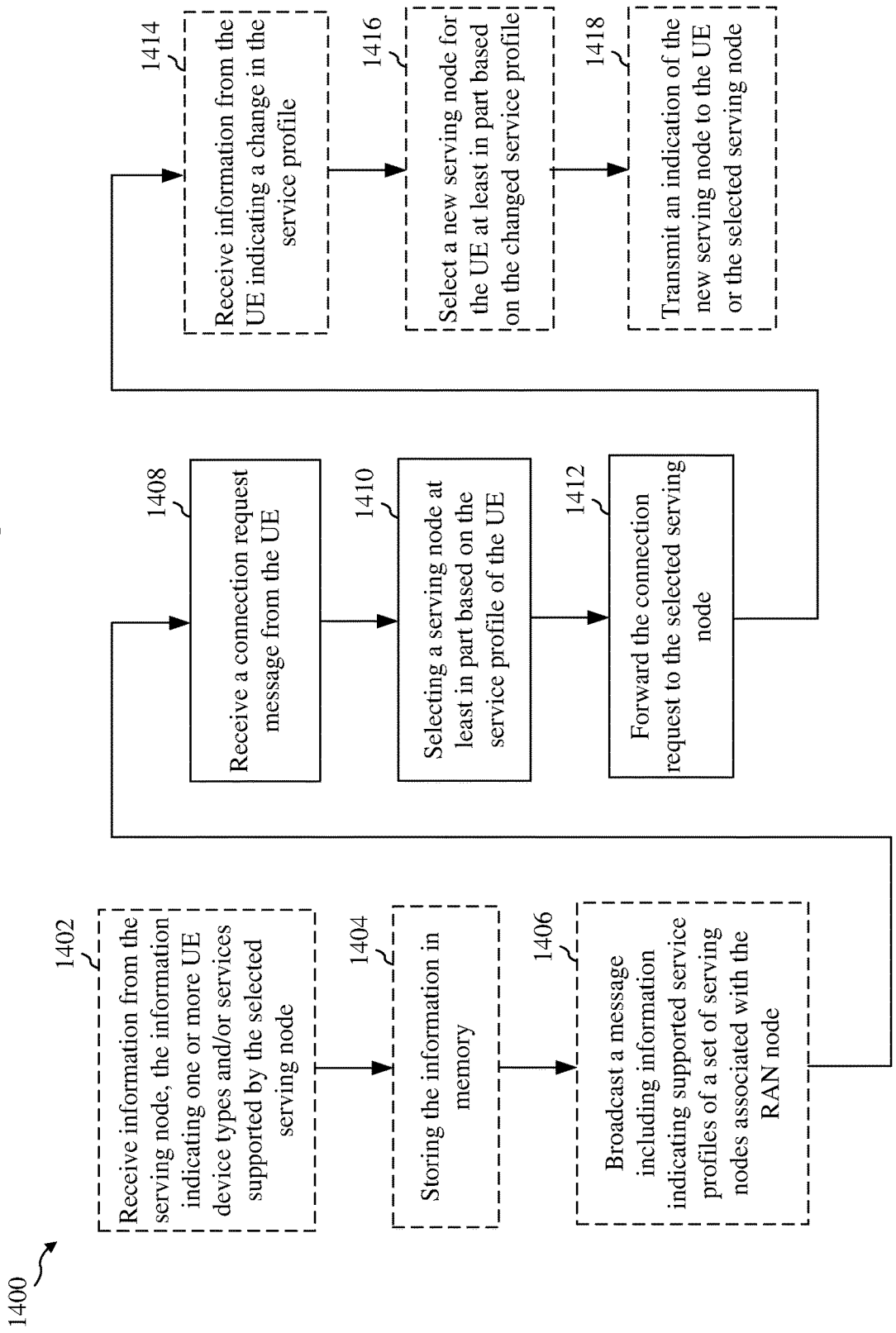
FIG. 14 is a diagram illustrating an example of various methods and/or processes operable at a RAN node.

FIG. 14 is a diagram 1400 illustrating an example of various methods and/or processes operable at the RAN node 106. At step 1402, the RAN node 106 may receive information from the serving node. Such information may indicate one or more UE device types and/or services supported by the selected serving node. Such information may also include an identifier that identifies the UE 102. Such information may include various aspect described herein with reference to the service profile of the UE 102. At step 1404, the RAN node 106 may store such information in the memory of the RAN node 106. In some configurations, such information may be received by the RAN node 106 as signaling that includes a part of establishment signaling for establishing an interface between the RAN node 106 and the selected serving node. In some other configurations, such information may be received by the RAN node 106 as OAM signaling between the RAN node 106 and the selected serving node.

At step 1406, the RAN node 106 may broadcast a message including information indicating supported service profiles of a set of serving nodes associated with the RAN node. By broadcasting such a message, the RAN node 106 may provide notification to UEs about the capabilities of the set of serving nodes associated with the RAN node 106 to support various support profiles. For example, referring to FIG. 11, the RAN node 106 may broadcast such a message to indicate the supported service profiles of serving node 112 and serving node 1112.

At step 1408, the RAN node 106 may receive a connection request message from the UE 102. For example, referring to FIG. 10, the RAN node 106 may receive the attach request 1002 from the UE 102. The connection request message (e.g., attach request 1002) may include information configured to indicate a service profile of the UE. Additional information pertaining to the service profile of the UE 102 is provided above and therefore will not be repeated.

At step 1410, the RAN node 106 may select a serving node for the UE 102 at least in part based on the service profile of the UE 102. For example, referring to FIG. 10, at block 1004, the RAN node 106 may select serving node 112 at least in part because serving node 112 supports the service profile of the UE 102. In some configurations, the RAN node 106 may select the serving node for the UE 102 by: (i) determining a set of one or more serving nodes capable of attaching to a UE 102 having a device type as indicated in the service profile of the UE 102; and (ii) selecting the serving node from among the set of one or more serving nodes in accordance with capacity information element received from each serving node of the set of one or more serving nodes. At step 1412, the RAN node 106 may forward the connection request message to the selected serving node. For example, referring to FIG. 10, the RAN node 106 may forward the attach request 1006 to the serving node 112.

In some circumstances, the service profile of the UE 102 may change. For example, the UE 102 may have a change in one or more of the device types of the UE 102 and/or one or more services operational at the UE 102. In such circumstances, at step 1414, the RAN node 106 may receive information from the UE 102 indicating a change in the service profile of the UE 102. In accordance with a determination that the selected serving node does not support the changed service profile of the UE 102, at step 1416, the RAN node 106 may select a new serving node for the UE 102 at least in part based on the changed service profile of the UE 102. For example, referring to FIG. 11, upon determining that serving node 112 does not support the changed serving profile of the UE 102, the RAN node 106 may select a new serving node 1112 for the UE 102 because the existing serving node 112 does not support the changed service profile of the UE 102. At step 1418, the RAN node 106 may transmit an indication of the new serving node 1112 to the UE 102 or the existing serving node 112.

Various Methods and/or Processes Operable at the Serving Node

Figure 15:
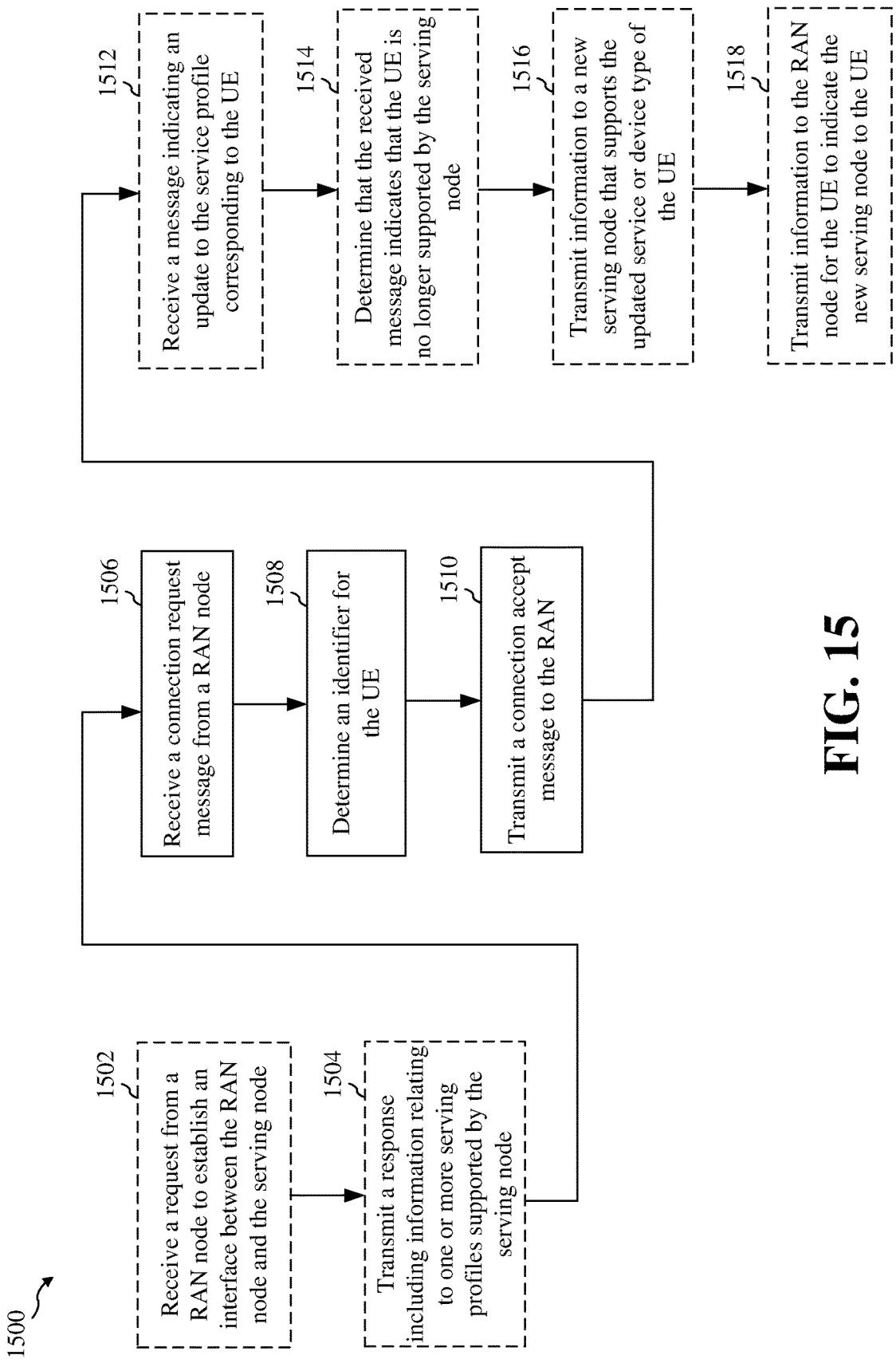
FIG. 15 is a diagram illustrating an example of various methods and/or processes operable at a serving node.

FIG. 15 is a diagram 1500 illustrating an example of various methods and/or processes operable at the serving node. At step 1502, the serving node may receive a request from the RAN node 106 to establish an interface between the RAN node 106 and the serving node 112. For example, referring to FIG. 9, the serving node 112 may receive an S1 setup request 902 from the RAN node 106 to establish an interface between the RAN node 106 and the serving node 112. At step 1504, the serving node may transmit a response including information relating to one or more service profiles supported by the serving node. For example, referring to FIG. 9, the serving node 112 may transmit the S1 setup response 904 to the RAN node 106, and the S1 setup response 904 may include information relating to the service profiles supported by the serving node 112.

Such information may be provided in various configurations without deviating from the scope of the present disclosure. In some configurations, such information may indicate one or more RATs supported by the serving node 112. The service profile may indicate one or more device types supported by the serving node 112. In some other configurations, such information may include one or more device identifier prefixes supported by the serving node 112. The service profile of the serving node 112 may be provided in various configurations without deviating from the scope of the present disclosure. The service profile may indicate one or more service profiles supported by the serving node 112. Additional description pertaining to the service profile is provided above and therefore will not be repeated.

At step 1506, the serving node may receive a connection request message from the RAN node 106. For example, referring to FIG. 10, the serving node 112 may receive the attach request 106 from the RAN node 106. The connection request message (e.g., attach request 106) may be configured to establish communication with the UE 102. The connection request message may include a service profile corresponding to the UE 102. At step 1508, the serving node may determine an identifier for the UE 102. The identifier may be a function of the service profile corresponding to the UE 102. At step 1510, the serving node may transmit a connection accept message to the RAN node 106. The connection accept message may include the identifier for the UE 102. For example, referring to FIG. 10, the serving node 112 may transmit the attach accept 1008, and the attach accept 1008 may include the identifier for the UE 102.

In some circumstances, the service profile of the UE 102 may change. For example, the UE 102 may have a change in one or more of the device types of the UE 102 and/or one or more services operational at the UE 102. In such circumstances, at step 1512, the serving node may receive a message indicating an update to the service profile corresponding to the UE. For example, referring to FIG. 11, the serving node 112 may receive the context request 1108. At step 1514, the serving node may determine that the received message indicates that the UE 102 is no longer supported by the serving node (e.g., serving node 112). For example, the serving node 112 may determine that the serving node 112 may no longer be able to support the updated service profile of the UE 102. Subsequently, at step 1516, the serving node may transmit information to another serving node that supports the updated service profile corresponding to the UE 102. For example, referring to FIG. 11, the serving node 1112 may support the updated service profile corresponding to the UE 102. Accordingly, the serving node 112 may transmit the context response 1110 to the serving node 1112.

In some configurations, at step 1518, the serving node may also transmit information to the RAN node 106 for the UE 102 to indicate the other serving node (e.g., serving node 1112) to the UE 102.

Hardware Implementation of the UE

Figure 16:
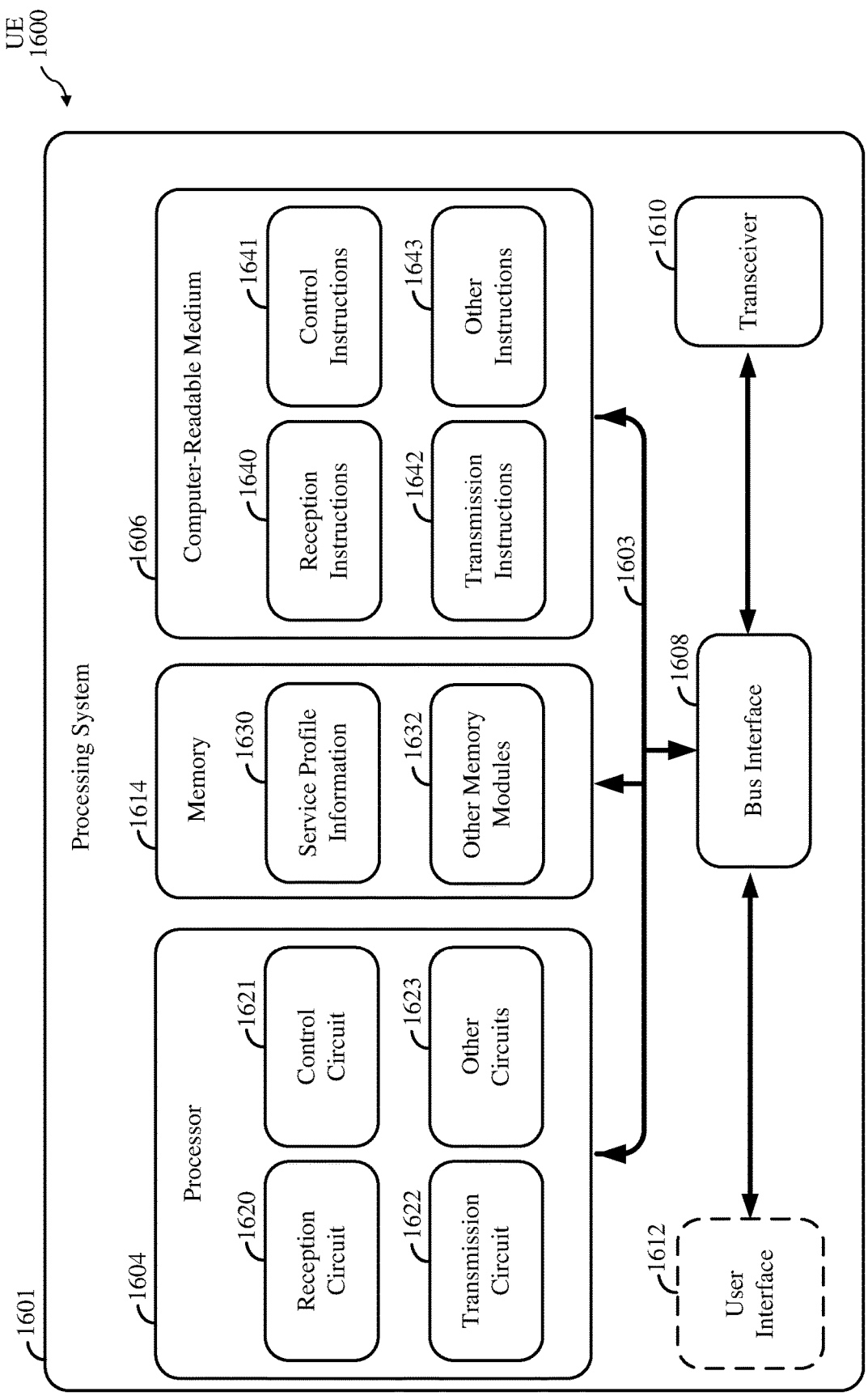
FIG. 16 is a diagram illustrating an example of a hardware implementation of a UE including a processing system.

FIG. 16 is a diagram illustrating an example of a hardware implementation of a UE including a processing system 1601. By way of example and not limitation, the UE 1600 described herein with reference to FIG. 16 may be the same as the UE 102 described herein with reference to FIGS. 1, 2, 6, 7, 8, 9, 10, 11, 12 and/or 13. In some configurations, the processing system 1601 may include a user interface 1612. The user interface 1612 may be configured to receive one or more inputs from a user of the processing system 1601. The user interface 1612 may also be configured to display information (e.g., text and/or images) to the user of the processing system 1601. The user interface 1612 may exchange data to and/or from the processing system 1601 via the bus interface 1608.

The processing system 1601 may also include a transceiver 1610. The transceiver 1610 may be configured to receive data and/or transmit data in communication with another apparatus. The transceiver 1610 provides a means for communicating with another apparatus via a wired and/or wireless transmission medium. The transceiver 1610 may be configured to perform such communications using various types of technologies. One of ordinary skill in the art will understand that many types of technologies to perform such communication may be used without deviating from the scope of the present disclosure. The processing system 1601 may also include a memory 1614, one or more processors 1604, a computer-readable medium 1606, and a bus interface 1608. The bus interface 1608 may provide an interface between a bus 1603 and the transceiver 1610. The memory 1614, the one or more processors 1604, the computer-readable medium 1606, and the bus interface 1608 may be connected together via the bus 1603. The processor 1604 may be communicatively coupled to the transceiver 1610 and/or the memory 1614.

The processor 1604 may include a reception circuit 1620, a control circuit 1621, a transmission circuit 1622 and/or other circuits 1623. Generally, the reception circuit 1620, the control circuit 1621, the transmission circuit 1622 and/or the other circuits 1623 may, individually or collectively, include various hardware components and/or software modules that can perform and/or enable any one or more of the functions, methods, operations, processes, features and/or aspects described herein with reference to a UE.

In some configurations, the control circuit 1621 may be configured to determine whether to include a service profile of the UE 1600 in a connection request message. Such a determination may be performed according to many configurations described in greater detail herein. For example, the control circuit 1621 may perform such a determination if the UE 1600 is not already registered at the network. As another example, the control circuit 1620 may perform such a determination if the service profile has changed since the UE 1600 last established a connection at the network. As yet another example, the control circuit 1620 may perform such a determination in accordance with a determination that a RAN node is associated with at least one of a network identifier, a tracking area code, a cell-ID, or an SSID known to the UE 1600 to support the service profile of the UE 1600 in accordance with a list of RAN nodes stored in a memory at the UE 1600.

The transmission circuit 1622 may be configured to utilize the transceiver 1610 to transmit the connection request message, wherein the connection request message is configured to request initial connection with the RAN node. The connection request message may include information configured to indicate a service profile of the UE 1600. The service profile may be configured to indicate one or more of a device type of the UE 1600 and/or one or more services operational at the UE 1600. As described in greater detail above, the service profile of the UE 1600 may include an implicit indication of the device type of the UE 1600 and/or explicit information configured to indicate the device type of the UE 1600. The device type of the UE 1600 may include a voice device, a streaming media device, a web browsing device, a mission-critical device, a low-power device, an Internet device, a sensor device, and/or an IOE device. Additional description pertaining to the service profile, device type, and services operable at the UE 1600 are provided above and therefore will not be repeated.

The reception circuit 1620 may be configured to receive a connection accept message. The connection accept message may include information configured to indicate a serving node selected at least in part based on the service profile of the UE 1600. In some circumstances, the service profile of the UE 1600 may change. For example, the UE 1600 may have a change in one or more of the device types of the UE 1600 and/or one or more services operational at the UE 1600. In such circumstances, the transmission circuit 1622 may be configured to utilize the transceiver 1610 to transmit information to the RAN node to indicate the change in the service profile. The RAN node may need to determine to select a new serving node. Accordingly, the reception circuit 1620 may be configured to utilize the transceiver 1610 to receive information indicating a change in the selected serving node. The change in the selected serving node may be in accordance with the changed service profile of the UE 1600. For example, as illustrated in FIG. 11, the information may indicate a change from one serving node 112 to another serving node 1112 because the other serving node 1112 can accommodate the changed service profile.

In some configurations, the reception circuit 1620 may be configured to receive a broadcast message from the RAN node. The broadcast message may include information indicating whether at least one serving node associated with the RAN node supports the device type of the UE 1600. The control circuit 1621 may be configured to determine to establish the initial connection with the RAN node in accordance with the received broadcast message. For example, as illustrated in FIG. 10, the UE 102 may determine to establish the initial connection with the RAN node 106 because at least one of the serving nodes 112, 1112 supports the particular device type of the UE 102. The transmission circuit 1622 may be configured to utilize the transceiver 1610 to transmit the connection request message, and the connection request message may be configured to request initial connection with the RAN node. The connection request message may include information configured to indicate a service profile of the UE 1600. The service profile may be configured to indicate one or more of a device type of the UE 1600 and/or one or more services operational at the UE 1600. Additional description pertaining to the service profile, device type, and services operable at the UE 1600 are provided above and therefore will not be repeated.

In some configurations, the transmission circuit 1622 may be configured to utilize the transceiver 1610 to transmit a TAU request message. The TAU request message may include information configured to indicate the service profile of the UE 1600. Such information may include, but is not limited to, a device ID, one or more device type(s), and/or one or more service(s) utilized by the UE 1600. The reception circuit 1620 may be configured to utilize the transceiver 1610 to receive a TAU request accept message. The TAU request accept message may include information indicating a serving node selected at least in part based on the service profile of the UE 1600.

The foregoing description provides a non-limiting example of the processor 1604 of the processing system 1601. Although various circuits have been described above, one of ordinary skill in the art will understand that the processor 1604 may also include various other circuits 1623 that are in addition and/or alternative(s) to circuits 1620, 1621, 1622. Such other circuits 1623 may provide the means for performing any one or more of the functions, methods, operations, processes, features and/or aspects described herein with reference to a UE.

The computer-readable medium 1606 includes various computer executable instructions. The computer-executable code may be executed by various hardware components (e.g., processor 1604, or any one or more of its circuits 1620, 1621, 1622, 1623) of the processing system 1601. The instructions may be a part of various software programs and/or software modules. The computer-readable medium 1606 may include reception instructions 1640, control instructions 1641, transmission instructions 1642 and/or other instructions 1643. Generally, the reception instructions 1640, the control instructions 1641, the transmission instructions 1642 and/or the other instructions 1643 may, individually or collectively, be configured for performing and/or enabling any one or more of the functions, methods, operations, processes, features and/or aspects described herein with reference to a UE.

In some configurations, the control instructions 1641 may include computer-executable instructions configured for determining whether to include a service profile of the UE 1600 in a connection request message. Such a determination may be performed according to many configurations described in greater detail above. For example, the control instructions 1641 may be configured to perform such a determination if the UE 1600 is not already registered at the network. As another example, the control instructions 1640 may be configured to perform such a determination if the service profile has changed since the UE 1600 last established a connection at the network. As yet another example, the control instructions 1640 may be configured to perform such a determination in accordance with a determination that a RAN node is associated with at least one of a network identifier, a tracking area code, a cell-ID, or an SSID known to the UE 1600 to support the service profile of the UE 1600 in accordance with a list of RAN nodes stored in a memory at the UE 1600.

The transmission instructions 1642 may include computer-executable instructions configured for transmitting the connection request message, and the connection request message may be configured to request initial connection with the RAN node. The connection request message may include information configured to indicate a service profile of the UE 1600. The service profile may be configured to indicate one or more of a device type of the UE 1600 and/or one or more services operational at the UE 1600. As described in greater detail above, the service profile of the UE 1600 may include an implicit indication of the device type of the UE 1600 and/or explicit information configured to indicate the device type of the UE 1600. The device type of the UE 1600 may include a voice device, a streaming media device, a web browsing device, a mission-critical device, a low-power device, an Internet device, a sensor device, and/or an IOE device. Additional description pertaining to the service profile, device type, and services operable at the UE 1600 are provided above and therefore will not be repeated.

The reception instructions 1640 may include computer-executable instructions configured for receiving a connection accept message. The connection accept message may include information configured to indicate a serving node selected at least in part based on the service profile of the UE 1600. In some circumstances, the service profile of the UE 1600 may change. For example, the UE 1600 may have a change in one or more of the device types of the UE 1600 and/or one or more services operational at the UE 1600. In such circumstances, the transmission instructions 1642 may include computer-executable instructions configured for transmitting information to the RAN node to indicate the change in the service profile. The RAN node may need to determine to select a new serving node. Accordingly, the reception instructions 1640 may include computer-executable instructions configured for receiving information indicating a change in the selected serving node. The change in the selected serving node may be in accordance with the changed service profile of the UE 1600. For example, as illustrated in FIG. 11, the information may indicate a change from the serving node 112 to the serving node 1112 because serving node 1112 can accommodate the changed service profile.

In some configurations, the reception instructions 1640 may include computer-executable instructions configured for receiving a broadcast message from the RAN node. The broadcast message may include information indicating whether at least one serving node associated with the RAN node supports the device type of the UE 1600. The control instructions 1641 may include computer-executable instructions configured for determining to establish the initial connection with the RAN node in accordance with the received broadcast message. For example, as illustrated in FIG. 10, the UE 102 may determine to establish the initial connection with the RAN node 106 because at least one of the serving nodes 112, 1112 supports the particular device type of the UE 102. The transmission instructions 1642 may include computer-executable instructions configured for transmitting the connection request message, and the connection request message may be configured to request initial connection with the RAN node. The connection request message may include information configured to indicate a service profile of the UE 1600. The service profile may be configured to indicate one or more of a device type of the UE 1600 and/or one or more services operational at the UE 1600. Additional description pertaining to the service profile, device type, and services operable at the UE 1600 are provided above and therefore will not be repeated.

In some configurations, the transmission instructions 1642 may include computer-executable instructions configured for transmitting a TAU request message. The TAU request message may include information configured to indicate the service profile of the UE 1600. Such information may include, but is not limited to, a device ID, one or more device type(s), and/or one or more service(s) utilized by the UE 1600. The reception instructions 1640 may include computer-executable instructions configured for receiving a TAU request accept message. The TAU request accept message may include information indicating a serving node selected at least in part based on the service profile of the UE 1600.

The foregoing description provides a non-limiting example of the computer-readable medium 1606 of the processing system 1601. Although various instructions (e.g., computer-executable code) have been described above, one of ordinary skill in the art will understand that the computer-readable medium 1606 may also include various other instructions 1643 that are in addition and/or alternative(s) to instructions 1640, 1641, 1642. Such other instructions 1643 may include computer-executable code configured for performing any one or more of the functions, methods, processes, operations, features and/or aspects described herein with reference to a UE.

The memory 1614 may include various memory modules. The memory modules may be configured to store, and have read therefrom, various values and/or information by the processor 1604, or any of its circuits 1620, 1621, 1622, 1623. The memory modules may also be configured to store, and have read therefrom, various values and/or information upon execution of the computer-executable code included in the computer-readable medium 1606, or any of its instructions 1640, 1641, 1642, 1643. In some configurations, the memory 1614 may include service profile information 1630. The service profile information 1630 may include data pertaining to the service profile. The service profile may be configured to indicate one or more of a device type of the UE 1600 and/or one or more services operational at the UE 1600. As described in greater detail above, the service profile of the UE 1600 may include an implicit indication of the device type of the UE 1600 and/or explicit information configured to indicate the device type of the UE 1600. The device type of the UE 1600 may include a voice device, a streaming media device, a web browsing device, a mission-critical device, a low-power device, an Internet device, a sensor device, and/or an IOE device. Additional description pertaining to the service profile, device type, and services operable at the UE 1600 are provided above and therefore will not be repeated. One of ordinary skill in the art will also understand that the memory 1614 may also include various other memory modules 1632. The other memory modules 1632 may be configured for storing information therein, and reading information therefrom, with respect to any of the features, functions, methods, processes, operations and/or aspects described herein.

One of ordinary skill in the art will also understand that the processing system 1601 may include alternative and/or additional elements without deviating from the scope of the present disclosure. In accordance with some aspects of the present disclosure, an element, or any portion of an element, or any combination of elements may be implemented with a processing system 1601 that includes one or more processors 1604. Examples of the one or more processors 1604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processing system 1601 may be implemented with a bus architecture, represented generally by the bus 1603 and bus interface 1608. The bus 1603 may include any number of interconnecting buses and bridges depending on the specific application of the processing system 1601 and the overall design constraints. The bus 1603 may link together various circuits including the one or more processors 1604, the memory 1614, and the computer-readable media 1606. The bus 1603 may also link various other circuits such as timing sources, peripherals, voltage regulators, and power management circuits, which are well known in the art.

The one or more processors 1604 may be responsible for managing the bus 1603 and general processing, including the execution of software stored on the computer-readable medium 1606. The software, when executed by the one or more processors 1604, causes the processing system 1601 to perform the various functions described below for any one or more apparatuses. The computer-readable medium 1606 may also be used for storing data that is manipulated by the one or more processors 1604 when executing software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 1606. The computer-readable medium 1606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1606 may also include, by way of example, a carrier wave, a transmission line, and any other suitable medium for transmitting software and/or instructions that may be accessed and read by a computer. The computer-readable medium 1606 may reside in the processing system 1601, external to the processing system 1601, or distributed across multiple entities including the processing system 1601. The computer-readable medium 1606 may be embodied in a computer program product. By way of example and not limitation, a computer program product may include a computer-readable medium in packaging materials. Those skilled in the art will recognize how best to implement the described functionality presented throughout this disclosure depending on the particular application and the overall design constraints imposed on the overall system.

Hardware Implementation of the RAN Node

Figure 17:
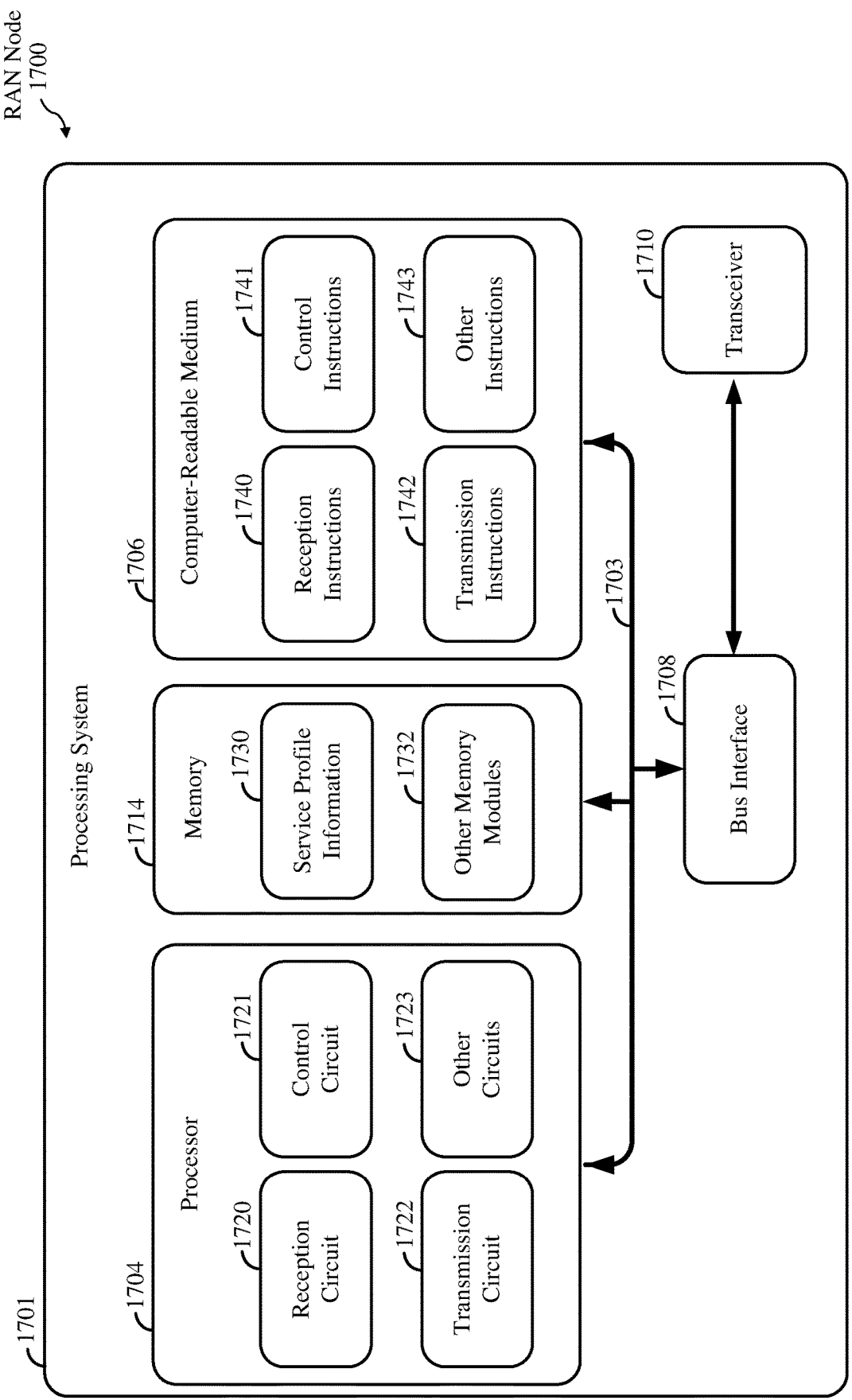
FIG. 17 is a diagram illustrating an example of a hardware implementation of a RAN node including a processing system.

FIG. 17 is a diagram illustrating an example of a hardware implementation of a RAN node 1700 including a processing system 1701. By way of example and not limitation, the RAN node 1700 described herein with reference to FIG. 17 may be the same as the RAN node 106 described herein with reference to FIGS. 1, 2, 6, 7, 8, 9, 10, 11 and/or 14. The processing system 1701 may include a transceiver 1710. The transceiver 1710 may be configured to receive data and/or transmit data in communication with another apparatus. The transceiver 1710 provides a means for communicating with another apparatus via a wired and/or wireless transmission medium. The transceiver 1710 may be configured to perform such communications using various types of technologies. One of ordinary skill in the art will understand that many types of technologies to perform such communication may be used without deviating from the scope of the present disclosure. The processing system 1701 may also include a memory 1714, one or more processors 1704, a computer-readable medium 1706, and a bus interface 1708. The bus interface 1708 may provide an interface between a bus 1703 and the transceiver 1710. The memory 1714, the one or more processors 1704, the computer-readable medium 1706, and the bus interface 1708 may be connected together via the bus 1703. The processor 1704 may be communicatively coupled to the transceiver 1710 and/or the memory 1714.

The processor 1704 may include a reception circuit 1720, a control circuit 1721, a transmission circuit 1722 and/or other circuits 1723. Generally, the reception circuit 1720, the control circuit 1721, the transmission circuit 1722 and/or the other circuits 1723 may, individually or collectively, include various hardware components and/or software modules that can perform and/or enable any one or more of the functions, methods, operations, processes, features and/or aspects described herein with reference to a RAN node.

The reception circuit 1720 may be configured to utilize the transceiver 1710 to receive information from a serving node. Such information may indicate one or more UE device types and/or services supported by the selected serving node. Such information may also include an identifier that identifies the UE. Such information may include various aspect described herein with reference to the service profile of the UE. The control circuit 1721 may be configured to store such information in the memory of the RAN node 1700. In some configurations, such information may be received by the RAN node 1700 as signaling that includes a part of establishment signaling for establishing an interface between the RAN node 1700 and the selected serving node. In some other configurations, such information may be received by the RAN node 1700 as OAM signaling between the RAN node 1700 and the selected serving node.

In some configurations, the transmission circuit 1722 may be configured to utilize the transceiver 1710 to broadcast a message including information indicating supported service profiles of a set of serving nodes associated with the RAN node 170. By broadcasting such a message, the RAN node 1700 may provide notification to UEs about the capabilities of the set of serving nodes associated with the RAN node 1700 to support various support profiles. For example, referring to FIG. 11, the RAN node 106 may broadcast such a message to indicate the supported service profiles of the existing serving node 112 and the new serving node 1112.

In some configurations, the reception circuit 1720 may be configured to receive a connection request message from the UE. For example, referring to FIG. 10, the RAN node 106 may receive the attach request 1002 from the UE 102. The connection request message may include information configured to indicate a service profile of the UE. Additional information pertaining to the service profile of the UE is provided above and therefore will not be repeated.

In some configurations, the control circuit 1721 may be configured to select a serving node for the UE at least in part based on the service profile of the UE. For example, referring to FIG. 10, at block 1004, the RAN node 106 may select a serving node 112 at least in part because that serving node 112 supports the service profile of the UE 102. In some configurations, the control circuit 1721 may be configured to select the serving node for the UE by: (i) determining a set of one or more serving nodes capable of attaching to a UE having a device type as indicated in the service profile of the UE; and (ii) selecting the serving node from among the set of one or more serving nodes in accordance with capacity information element received from each serving node of the set of one or more serving nodes. The transmission circuit 1722 may be configured to utilize the transceiver 1710 to forward the connection request message to the selected serving node. For example, as illustrated in FIG. 10, the RAN node 106 may forward the attach request 1006 to the serving node 112.

In some circumstances, the service profile of the UE may change. For example, the UE may have a change in one or more of the device types of the UE and/or one or more services operational at the UE. In such circumstances, the reception circuit 1720 may be configured to utilize the transceiver 1710 to receive information from the UE indicating a change in the service profile of the UE. In accordance with a determination that the selected serving node does not support the changed service profile of the UE, the control circuit 1721 may be configured to select a new serving node for the UE at least in part based on the changed service profile of the UE. For example, as illustrated in FIG. 11, upon determining that serving node 112 does not support the changed serving profile of the UE 102, the RAN node 106 may select a new serving node 1112 for the UE 102 because that serving node 1112 supports the changed service profile of the UE 102. The transmission circuit 1722 may be configured to transmit an indication of the new serving node (e.g., serving node 1112) to the UE or the existing serving node (e.g., serving node 112).

The foregoing description provides a non-limiting example of the processor 1704 of the processing system 1701. Although various circuits have been described above, one of ordinary skill in the art will understand that the processor 1704 may also include various other circuits 1723 that are in addition and/or alternative(s) to circuits 1720, 1721, 1722. Such other circuits 1723 may provide the means for performing any one or more of the functions, methods, operations, processes, features and/or aspects described herein with reference to a RAN node.

The computer-readable medium 1706 includes various computer executable instructions. The computer-executable code may be executed by various hardware components (e.g., processor 1704, or any one or more of its circuits 1720, 1721, 1722, 1723) of the processing system 1701. The instructions may be a part of various software programs and/or software modules. The computer-readable medium 1706 may include reception instructions 1740, control instructions 1741, transmission instructions 1742 and/or other instructions 1743. Generally, the reception instructions 1740, the control instructions 1741, the transmission instructions 1742 and/or the other instructions 1743 may, individually or collectively, be configured for performing and/or enabling any one or more of the functions, methods, operations, processes, features and/or aspects described herein with reference to a RAN node.

The reception instructions 1740 may include computer-executable code configured for receiving information from a serving node. Such information may indicate one or more UE device types and/or services supported by the selected serving node. Such information may also include an identifier that identifies the UE. Such information may include various aspect described herein with reference to the service profile of the UE. The control instructions 1741 may include computer-executable code configured for storing such information in the memory of the RAN node 1700. In some configurations, such information may be received by the RAN node 1700 as signaling that includes a part of establishment signaling for establishing an interface between the RAN node 1700 and the selected serving node. In some other configurations, such information may be received by the RAN node 1700 as OAM signaling between the RAN node 1700 and the selected serving node.

In some configurations, the transmission instructions 1742 may include computer-executable code configured for broadcasting a message including information indicating supported service profiles of a set of serving nodes associated with the RAN node 170. By broadcasting such a message, the RAN node 1700 may provide notification to UEs about the capabilities of the set of serving nodes associated with the RAN node 1700 to support various support profiles. For example, referring to FIG. 11, the RAN node 1700 may broadcast such a message to indicate the supported service profiles of serving node 112 and serving node 1112.

In some configurations, the reception instructions 1740 may include computer-executable code configured for receiving a connection request message from the UE. For example, referring to FIG. 10, the RAN node 106 may receive the attach request 1002 from the UE 102. The connection request message may include information configured to indicate a service profile of the UE. Additional information pertaining to the service profile of the UE is provided above and therefore will not be repeated.

In some configurations, the control instructions 1741 may include computer-executable code configured for selecting a serving node for the UE at least in part based on the service profile of the UE. For example, referring to FIG. 10, at block 1004, the RAN node 106 may select serving node 112 at least in part because serving node 112 supports the service profile of the UE 102. In some configurations, the control instructions 1741 may include computer-executable code configured for selecting the serving node for the UE by: (i) determining a set of one or more serving nodes capable of attaching to a UE having a device type as indicated in the service profile of the UE; and (ii) selecting the serving node from among the set of one or more serving nodes in accordance with capacity information element received from each serving node of the set of one or more serving nodes. The transmission instructions 1742 may include computer-executable code configured for forwarding the connection request message to the selected serving node. For example, as illustrated in FIG. 10, the RAN node 106 may forward the attach request 1006 to the serving node 112.

In some circumstances, the service profile of the UE may change. For example, the UE may have a change in one or more of the device types of the UE and/or one or more services operational at the UE. In such circumstances, the reception instructions 1740 may include computer-executable code configured for receiving information from the UE indicating a change in the service profile of the UE. In accordance with a determination that the selected serving node does not support the changed service profile of the UE, the control instructions 1741 may include computer-executable code configured for selecting a new serving node for the UE at least in part based on the changed service profile of the UE. For example, as illustrated in FIG. 11, upon determining that serving node 112 does not support the changed serving profile of the UE 102, the RAN node 106 may select a new serving node 1112 for the UE 102 because that serving node 1112 supports the changed service profile of the UE 102. The transmission instructions 1742 may include computer-executable code configured for transmitting an indication of the new serving node (e.g., serving node 1112) to the UE or the existing serving node (e.g., serving node 112).

The foregoing description provides a non-limiting example of the computer-readable medium 1706 of the processing system 1701. Although various instructions (e.g., computer-executable code) have been described above, one of ordinary skill in the art will understand that the computer-readable medium 1706 may also include various other instructions 1743 that are in addition and/or alternative(s) to instructions 1740, 1741, 1742. Such other instructions 1743 may include computer-executable code configured for performing any one or more of the functions, methods, processes, operations, features and/or aspects described herein with reference to a RAN node.

The memory 1714 may include various memory modules. The memory modules may be configured to store, and have read therefrom, various values and/or information by the processor 1704, or any of its circuits 1720, 1721, 1722, 1723. The memory modules may also be configured to store, and have read therefrom, various values and/or information upon execution of the computer-executable code included in the computer-readable medium 1706, or any of its instructions 1740, 1741, 1742, 1743. In some configurations, the memory 1714 may include service profile information 1730. The service profile information 1730 may include data pertaining to the service profile. The service profile may be configured to indicate one or more of a device type of any apparatus and/or one or more services operational at that apparatus. As described in greater detail above, the service profile of the may include an implicit indication of the device type of such the apparatus and/or explicit information configured to indicate the device type of that apparatus. The device type may include a voice device, a streaming media device, a web browsing device, a mission-critical device, a low-power device, an Internet device, a sensor device, and/or an IOE device. Additional description pertaining to the service profile, device type, and services operable are provided above and therefore will not be repeated. One of ordinary skill in the art will also understand that the memory 1714 may also include various other memory modules 1732. The other memory modules 1732 may be configured for storing information therein, and reading information therefrom, with respect to any of the features, functions, methods, processes, operations and/or aspects described herein with reference to a RAN node.

One of ordinary skill in the art will also understand that the processing system 1701 may include alternative and/or additional elements without deviating from the scope of the present disclosure. In accordance with some aspects of the present disclosure, an element, or any portion of an element, or any combination of elements may be implemented with a processing system 1701 that includes one or more processors 1704. Examples of the one or more processors 1704 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processing system 1701 may be implemented with a bus architecture, represented generally by the bus 1703 and bus interface 1708. The bus 1703 may include any number of interconnecting buses and bridges depending on the specific application of the processing system 1701 and the overall design constraints. The bus 1703 may link together various circuits including the one or more processors 1704, the memory 1714, and the computer-readable media 1706. The bus 1703 may also link various other circuits such as timing sources, peripherals, voltage regulators, and power management circuits, which are well known in the art.

The one or more processors 1704 may be responsible for managing the bus 1703 and general processing, including the execution of software stored on the computer-readable medium 1706. The software, when executed by the one or more processors 1704, causes the processing system 1701 to perform the various functions described below for any one or more apparatuses. The computer-readable medium 1706 may also be used for storing data that is manipulated by the one or more processors 1704 when executing software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 1706. The computer-readable medium 1706 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1706 may also include, by way of example, a carrier wave, a transmission line, and any other suitable medium for transmitting software and/or instructions that may be accessed and read by a computer. The computer-readable medium 1706 may reside in the processing system 1701, external to the processing system 1701, or distributed across multiple entities including the processing system 1701. The computer-readable medium 1706 may be embodied in a computer program product. By way of example and not limitation, a computer program product may include a computer-readable medium in packaging materials. Those skilled in the art will recognize how best to implement the described functionality presented throughout this disclosure depending on the particular application and the overall design constraints imposed on the overall system.

Hardware Implementation of the Serving Node

Figure 18:
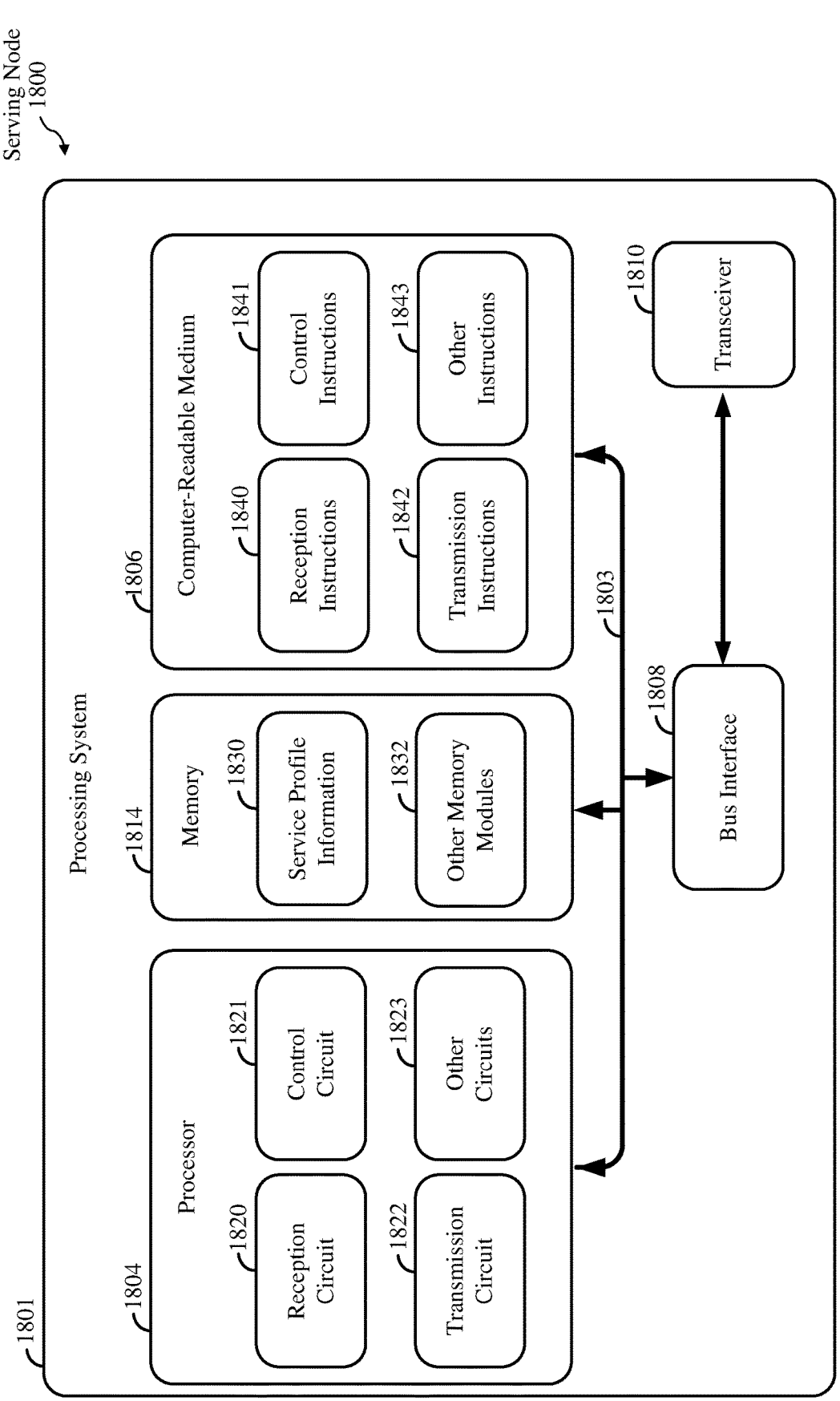
FIG. 18 is a diagram illustrating an example of a hardware implementation of a serving node including a processing system.

FIG. 18 is a diagram illustrating an example of a hardware implementation of a serving node 1800 including a processing system 1801. By way of example and not limitation, the serving node 1800 described herein with reference to FIG. 18 may be the same as the serving node(s) 112, 1112 described herein with reference to FIGS. 1, 2, 7, 8, 9, 10, 11 and/or 15. The processing system 1801 may include a transceiver 1810. The transceiver 1810 may be configured to receive data and/or transmit data in communication with another apparatus. The transceiver 1810 provides a means for communicating with another apparatus via a wired and/or wireless transmission medium. The transceiver 1810 may be configured to perform such communications using various types of technologies. One of ordinary skill in the art will understand that many types of technologies to perform such communication may be used without deviating from the scope of the present disclosure. The processing system 1801 may also include a memory 1814, one or more processors 1804, a computer-readable medium 1806, and a bus interface 1808. The bus interface 1808 may provide an interface between a bus 1803 and the transceiver 1810. The memory 1814, the one or more processors 1804, the computer-readable medium 1806, and the bus interface 1808 may be connected together via the bus 1803. The processor 1804 may be communicatively coupled to the transceiver 1810 and/or the memory 1814.

The processor 1804 may include a reception circuit 1820, a control circuit 1821, a transmission circuit 1822 and/or other circuits 1823. Generally, the reception circuit 1820, the control circuit 1821, the transmission circuit 1822 and/or the other circuits 1823 may, individually or collectively, include various hardware components and/or software modules that can perform and/or enable any one or more of the functions, methods, operations, processes, features and/or aspects described herein with reference to a serving node.

The reception circuit 1820 may be configured to utilize the transceiver 1810 receive a request from a RAN node to establish an interface between the RAN node and the serving node. For example, as illustrated in FIG. 9, the serving node 112 may receive an S1 setup request 902 from the RAN node 106 to establish an interface between the RAN node 106 and the serving node 112. The transmission circuit 1822 may be configured to utilize the transceiver 1810 to transmit a response including information relating to one or more service profiles supported by the serving node. For example, as illustrated in FIG. 9, the serving node 112 may transmit the S1 setup response 904 to the RAN node 106, and the S1 setup response 904 may include information relating to the service profiles supported by the serving node 112.

Such information may be provided in various configurations without deviating from the scope of the present disclosure. In some configurations, such information may indicate one or more RATs supported by the serving node. The service profile may indicate one or more device types supported by the serving node. In some other configurations, such information may include one or more device identifier prefixes supported by the serving node. The service profile of the serving node be provided in various configurations without deviating from the scope of the present disclosure. The service profile may indicate one or more service profiles supported by the serving node. Additional description pertaining to the service profile is provided above and therefore will not be repeated.

The reception circuit 1820 may be configured to utilize the transceiver 1810 to receive a connection request message from the RAN node. For example, as illustrated in FIG. 10, the serving node 112 may receive the attach request 106 from the RAN node 106. The connection request message may be configured to establish communication with the UE. The connection request message may include a service profile corresponding to the UE. The control circuit 1821 may be configured to determine an identifier for the UE. The identifier may be a function of the service profile corresponding to the UE. In some configurations, the transmission circuit 1822 may be configured to utilize the transceiver 1810 to transmit a connection accept message to the RAN node. The connection accept message may include the identifier for the UE. For example, as illustrated in FIG. 10, the serving node 112 may transmit the attach accept 1008, and the attach accept 1008 may include the identifier for the UE 102.

In some circumstances, the service profile of the UE may change. For example, the UE may have a change in one or more of the device types of the UE and/or one or more services operational at the UE. In such circumstances, the reception circuit 1820 may be configured to utilize the transceiver 1810 to receive a message indicating an update to the service profile corresponding to the UE. For example, as illustrated in FIG. 11, the serving node 112 may receive the context request 1108. The control circuit 1821 may be configured to determine that the received message indicates that the UE is no longer supported by the serving node. For example, as illustrated in FIG. 11, the serving node 112 may determine that the serving node 112 no longer supports the updated service profile of the UE 102. Accordingly, the transmission circuit 1822 may be configured to utilize the transceiver 1810 to transmit information to another serving node that supports the updated service profile corresponding to the UE. For example, as illustrated in FIG. 11, the serving node 1112 may support the updated service profile corresponding to the UE 102. As such, the serving node 112 may transmit the context response 1110 to the serving node 1112. In some configurations, the transmission circuit may also be configured to utilize the transceiver 1810 to transmit information to the RAN node for the UE to indicate the other serving node (e.g., serving node 1112) to the UE.

The foregoing description provides a non-limiting example of the processor 1804 of the processing system 1801. Although various circuits have been described above, one of ordinary skill in the art will understand that the processor 1804 may also include various other circuits 1823 that are in addition and/or alternative(s) to circuits 1820, 1821, 1822. Such other circuits 1823 may provide the means for performing any one or more of the functions, methods, operations, processes, features and/or aspects described herein with reference to a serving node.

The computer-readable medium 1806 includes various computer executable instructions. The computer-executable code may be executed by various hardware components (e.g., processor 1804, or any one or more of its circuits 1820, 1821, 1822, 1823) of the processing system 1801. The instructions may be a part of various software programs and/or software modules. The computer-readable medium 1806 may include reception instructions 1840, control instructions 1841, transmission instructions 1842 and/or other instructions 1843. Generally, the reception instructions 1840, the control instructions 1841, the transmission instructions 1842 and/or the other instructions 1843 may, individually or collectively, be configured for performing and/or enabling any one or more of the functions, methods, operations, processes, features and/or aspects described herein with reference to a serving node.

The reception instructions 1840 may include computer-executable instructions configure for receiving a request from a RAN node to establish an interface between the RAN node and the serving node. For example, as illustrated in FIG. 9, the serving node 112 may receive an S1 setup request 902 from the RAN node 106 to establish an interface between the RAN node 106 and the serving node 112. The transmission instructions 1842 may include computer-executable instructions configure for transmitting a response including information relating to one or more service profiles supported by the serving node. For example, as illustrated in FIG. 9, the serving node 112 may transmit the S1 setup response 904 to the RAN node 106, and the S1 setup response 904 may include information relating to the service profiles supported by the serving node 112.

Such information may be provided in various configurations without deviating from the scope of the present disclosure. In some configurations, such information may indicate one or more RATs supported by the serving node. The service profile may indicate one or more device types supported by the serving node. In some other configurations, such information may include one or more device identifier prefixes supported by the serving node. The service profile of the serving node may be provided in various configurations without deviating from the scope of the present disclosure. The service profile may indicate one or more service profiles supported by the serving node. Additional description pertaining to the service profile is provided above and therefore will not be repeated.

The reception instructions 1840 may include computer-executable instructions configured for receiving a connection request message from the RAN node. For example, as illustrated in FIG. 10, the serving node 112 may receive the attach request 106 from the RAN node 106. The connection request message may be configured to establish communication with the UE. The connection request message may include a service profile corresponding to the UE. The control instructions 1841 may include computer-executable instructions configure for determining an identifier for the UE. The identifier may be a function of the service profile corresponding to the UE. In some configurations, the transmission instructions 1842 may include computer-executable instructions configure for transmitting a connection accept message to the RAN node. The connection accept message may include the identifier for the UE. For example, as illustrated in FIG. 10, the serving node 112 may transmit the attach accept 1008, and the attach accept 1008 may include the identifier for the UE 102.

In some circumstances, the service profile of the UE may change. For example, the UE may have a change in one or more of the device types of the UE and/or one or more services operational at the UE. In such circumstances, the reception instructions 1840 may include computer-executable instructions configure for receiving a message indicating an update to the service profile corresponding to the UE. For example, as illustrated in FIG. 11, the serving node 112 may receive the context request 1108. The control instructions 1841 may include computer-executable instructions configure for determining that the received message indicates that the UE is no longer supported by the serving node. For example, as illustrated in FIG. 11, the serving node 112 may determine that the serving node 112 no longer supports the updated service profile of the UE 102. Accordingly, the transmission instructions 1842 may include computer-executable instructions configure for transmitting information to another serving node that supports the updated service profile corresponding to the UE. For example, as illustrated in FIG. 11, the new serving node 1112 may support the updated service profile corresponding to the UE 102. As such, the existing serving node 112 may transmit the context response 1110 to the new serving node 1112. In some configurations, the transmission circuit may also be configured to utilize the transceiver 1810 to transmit information to the RAN node for the UE to indicate the other serving node (e.g., new serving node 1112) to the UE.

The foregoing description provides a non-limiting example of the computer-readable medium 1806 of the processing system 1801. Although various instructions (e.g., computer-executable code) have been described above, one of ordinary skill in the art will understand that the computer-readable medium 1806 may also include various other instructions 1843 that are in addition and/or alternative(s) to instructions 1840, 1841, 1842. Such other instructions 1843 may include computer-executable code configured for performing any one or more of the functions, methods, processes, operations, features and/or aspects described herein with reference to a serving node.

The memory 1814 may include various memory modules. The memory modules may be configured to store, and have read therefrom, various values and/or information by the processor 1804, or any of its circuits 1820, 1821, 1822, 1823. The memory modules may also be configured to store, and have read therefrom, various values and/or information upon execution of the computer-executable code included in the computer-readable medium 1806, or any of its instructions 1840, 1841, 1842, 1843. In some configurations, the memory 1814 may include service profile information 1830. The service profile information 1830 may include data pertaining to the service profile. The service profile may be configured to indicate one or more of a device type of any apparatus and/or one or more services operational at that apparatus. As described in greater detail above, the service profile of the may include an implicit indication of the device type of such the apparatus and/or explicit information configured to indicate the device type of that apparatus. The device type may include a voice device, a streaming media device, a web browsing device, a mission-critical device, a low-power device, an Internet device, a sensor device, and/or an IOE device. Additional description pertaining to the service profile, device type, and services operable are provided above and therefore will not be repeated. One of ordinary skill in the art will also understand that the memory 1814 may also include various other memory modules 1832. The other memory modules 1832 may be configured for storing information therein, and reading information therefrom, with respect to any of the features, functions, methods, processes, operations and/or aspects described herein with reference to a serving node.

One of ordinary skill in the art will also understand that the processing system 1801 may include alternative and/or additional elements without deviating from the scope of the present disclosure. In accordance with some aspects of the present disclosure, an element, or any portion of an element, or any combination of elements may be implemented with a processing system 1801 that includes one or more processors 1804. Examples of the one or more processors 1804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processing system 1801 may be implemented with a bus architecture, represented generally by the bus 1803 and bus interface 1808. The bus 1803 may include any number of interconnecting buses and bridges depending on the specific application of the processing system 1801 and the overall design constraints. The bus 1803 may link together various circuits including the one or more processors 1804, the memory 1814, and the computer-readable media 1806. The bus 1803 may also link various other circuits such as timing sources, peripherals, voltage regulators, and power management circuits, which are well known in the art.

The one or more processors 1804 may be responsible for managing the bus 1803 and general processing, including the execution of software stored on the computer-readable medium 1806. The software, when executed by the one or more processors 1804, causes the processing system 1801 to perform the various functions described below for any one or more apparatuses. The computer-readable medium 1806 may also be used for storing data that is manipulated by the one or more processors 1804 when executing software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 1806. The computer-readable medium 1806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1806 may also include, by way of example, a carrier wave, a transmission line, and any other suitable medium for transmitting software and/or instructions that may be accessed and read by a computer. The computer-readable medium 1806 may reside in the processing system 1801, external to the processing system 1801, or distributed across multiple entities including the processing system 1801. The computer-readable medium 1806 may be embodied in a computer program product. By way of example and not limitation, a computer program product may include a computer-readable medium in packaging materials. Those skilled in the art will recognize how best to implement the described functionality presented throughout this disclosure depending on the particular application and the overall design constraints imposed on the overall system.

One or more of the components, steps, features and/or functions illustrated in FIGS. 12-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 12-15 may be configured to perform one or more of the methods, features, or steps described herein. The novel algorithms described herein may also be efficiently implemented in software and/or embedded in hardware. It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

As mentioned above, several aspects of a telecommunications system described herein have been presented with reference to an LTE system. As those skilled in the art will readily appreciate, various aspects described throughout the present disclosure may be extended to other telecommunication systems, network architectures and communication standards, including a 5G system or any other suitable system defined by 3GPP or other standards body. The actual telecommunication standard, network architecture, and/or communication standard employed may depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

The previous description is provided to enable any person skilled in the art to practice some aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of some aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication operable at a user equipment (UE), the method comprising:
    transmitting a connection request message to a radio access network (RAN) node, the connection request message configured to request a connection with a serving node, the connection request message comprising information configured to indicate a service profile of the UE, the service profile being configured to indicate network behavior in relation to one or more services operational at the UE; and
    receiving a connection accept message comprising information configured to identify a selected serving node, selected at least in part based on the service profile of the UE.

2. The method of claim 1, further comprising:
    establishing the connection with the selected serving node identified in the connection accept message;
    transmitting information indicating a change in the service profile of the UE; and
    receiving information configured to identify a new serving node selected at least in part based on the change in the service profile of the UE.

3. The method of claim 1, further comprising:
    prior to the transmitting the connection request message, determining that the RAN node is associated with at least one serving node that supports the service profile of the UE.

4. The method of claim 3, wherein the determining comprises:
    receiving a broadcast message from the RAN node, comprising information indicating whether at least one serving node associated with the RAN node supports a service profile of the UE.

5. The method of claim 1, further comprising:
    prior to the transmitting the connection request message, determining that the RAN node is associated with at least one of a network identifier, a tracking area code, a cell identifier (cell-ID), or a service set identifier (SSID) known to the UE to support the service profile of the UE in accordance with a list of RAN nodes stored in a memory at the UE.

6. The method of claim 1, further comprising:
    transmitting a tracking area update (TAU) request message comprising information configured to indicate the service profile of the UE; and
    receiving a TAU response accept message comprising information indicating the selected serving node, selected at least in part based on the service profile of the UE.

7. A method of wireless communication operable at a radio access network (RAN) node, the method comprising:
    receiving a connection request message from a user equipment (UE), the connection request message configured to request a connection with a serving node, the connection request message comprising information configured to indicate a service profile of the UE, the service profile being configured to indicate network behavior in relation to one or more services operational at the UE;
    selecting a selected serving node for the UE at least in part based on the service profile of the UE; and
    forwarding the connection request message to the selected serving node.

8. The method of claim 7, further comprising:
    sending a signaling interface setup request message to the selected serving node, configured to request establishment of a signaling interface between the RAN node and the selected serving node,
    receiving, from the selected serving node, information relating to capabilities of the selected serving node to support one or more UE services; and
    storing the information in memory.

9. The method of claim 8, wherein the information relating to the capabilities of the selected serving node comprises at least one of:
    a device type list comprising one or more device types supported by the selected serving node;
    a services list comprising one or more services supported by the selected serving node;
    an initial device identifier prefix list comprising one or more device identifier prefixes supported by the selected serving node;
    a radio access technology (RAT) list comprising one or more RATs supported for access by the selected serving node; or
    combinations thereof.

10. The method of claim 8,
    wherein the information relating to the capabilities of the selected serving node comprises an initial device identifier prefix list comprising one or more device identifier prefixes supported by the selected serving node,
    wherein the connection request message further comprises a device identifier for the UE, and wherein the selecting the selected serving node for the UE is further based at least in part on a determination that the UE has an initial identifier that appears in the initial device identifier prefix list.

11. The method of claim 7, further comprising:
receiving information from the UE indicating a change in the service profile of the UE; and
in accordance with a determination that the selected serving node does not support the change in the service profile of the UE, selecting a new serving node for the UE at least in part based on the change in the service profile of the UE.

12. The method of claim 11, further comprising transmitting an indication of the new serving node to at least one of the UE or the selected serving node.

13. The method of claim 7, wherein the selecting the selected serving node for the UE comprises:
determining a set of one or more serving nodes capable of connecting to a UE having the service profile of the UE; and
wherein the selecting the selected serving node for the UE comprises selecting the selected serving node from among the set of one or more serving nodes based at least in part on a capacity information element received from each serving node of the set of one or more serving nodes.

14. The method of claim 7, further comprising:
broadcasting a message comprising information indicating supported service profiles of a set of serving nodes associated with the RAN node.

15. A method of wireless communication operable at a serving node, the method comprising:
receiving a connection request message from a radio access network (RAN) node, the connection request message configured to request a connection with a user equipment (UE) and comprising a service profile corresponding to the UE, the service profile being configured to indicate network behavior in relation to one or more services operational at the UE;
determining an identifier for the UE, the identifier being a function of the service profile corresponding to the UE; and
transmitting a connection accept message to the RAN node, the connection accept message comprising the identifier for the UE.

16. The method of claim 15, further comprising:
receiving a message indicating an update to the service profile corresponding to the UE;
determining that the received message indicates that the UE is no longer supported by the serving node; and
transmitting information to another serving node that supports the updated service profile corresponding to the UE.

17. The method of claim 16, further comprising transmitting information for the UE to the RAN node to indicate another serving node to the UE.

18. The method of claim 15, further comprising:
receiving a signaling interface setup request message from the RAN node, configured to request establishment of a signaling interface between the RAN node and the serving node; and
transmitting a response to the RAN node, comprising information relating to capabilities of the serving node to support one or more service profile.

19. The method of claim 18, wherein the information relating to capabilities of the serving node to support one or more service profiles comprises at least one of:
one or more UE services supported by the serving node; or
one or more device identifier prefixes supported by the serving node.

20. A user equipment (UE) configured for wireless communication, comprising:
a processor;
a memory communicatively coupled to the processor; and
a radio transceiver communicatively coupled to the processor,
wherein the processor is configured for:
transmitting, via the radio transceiver, a connection request message to a radio access network (RAN) node, the connection request message configured to request a connection with a serving node, the connection request message comprising information configured to indicate a service profile of the UE, the service profile being configured to indicate network behavior in relation to one or more services operational at the UE; and
receiving, via the radio transceiver, a connection accept message comprising information configured to identify a selected serving node, selected at least in part based on the service profile of the UE.

21. The UE of claim 20, wherein the processor is further configured for:
establishing a connection to the selected serving node identified in the connection accept message;
transmitting, via the radio transceiver, information indicating a change in the service profile of the UE; and
receiving, via the radio transceiver, information configured to identify a new serving node selected at least in part based on the change in the service profile of the UE.

22. The UE of claim 20, wherein the processor is further configured for:
prior to transmitting the connection request message, determining that the RAN node is associated with at least one serving node that supports the service profile of the UE.

23. The UE of claim 20, wherein the determining comprises:
receiving, via the radio transceiver, a broadcast message from the RAN node, comprising information indicating whether at least one serving node associated with the RAN node supports a service profile of the UE.

24. The UE of claim 20, wherein the processor is further configured for:
prior to transmitting the connection request message, determining that the RAN node is associated with at least one of a network identifier, a tracking area code, a cell identifier (cell-ID), or a service set identifier (SSID) known to the UE to support the service profile of the UE in accordance with a list of RAN nodes stored in a memory at the UE.

25. The UE of claim 20, wherein the processor is further configured for:
transmitting, via the radio transceiver, a tracking area update (TAU) request message comprising information configured to indicate the service profile of the UE; and
receiving, via the radio transceiver, a TAU response accept message comprising information indicating a serving node selected at least in part based on the service profile of the UE.

26. A radio access network (RAN) node configured for wireless communication, comprising:
a processor;

a memory communicatively coupled to the processor;
a radio transceiver communicatively coupled to the processor; and
a backhaul transceiver communicatively coupled to the processor,
wherein the processor is configured for:
receiving, via the radio transceiver, a connection request message from a user equipment (UE), the connection request message configured to request a connection with a serving node, the connection request message comprising information configured to indicate a service profile of the UE, the service profile being configured to indicate network behavior in relation to one or more services operational at the UE;
selecting a selected serving node for the UE at least in part based on the service profile of the UE; and
forwarding, via the backhaul transceiver, the connection request message to the selected serving node.

27. The RAN node of claim 26, wherein the processor is further configured for:
sending, via the backhaul transceiver, a signaling interface setup request message to the selected serving node, configured to request establishment of a signaling interface between the RAN node and the selected serving node,
receiving from the selected serving node, via the backhaul transceiver, information relating to capabilities of the selected serving node to support one or more UE services; and
storing the information in the memory.

28. The RAN node of claim 27, wherein the information relating to the capabilities of the selected serving node comprises at least one of:
a device type list comprising one or more device types supported by the selected serving node;
a services list comprising one or more services supported by the selected serving node;
an initial device identifier prefix list comprising one or more device identifier prefixes supported by the selected serving node;
a radio access technology (RAT) list comprising one or more RATs supported for access by the selected serving node; or
combinations thereof.

29. The RAN node of claim 27,
wherein the information relating to the capabilities of the selected serving node comprises an initial device identifier prefix list comprising one or more device identifier prefixes supported by the selected serving node,
wherein the connection request message further comprises a device identifier for the UE, and
wherein the processor, being configured for selecting the selected serving node for the UE, is further configured to base the selection of the selected serving node for the UE at least in part on a determination that the UE has an initial identifier that appears in the initial device identifier prefix list.

30. The RAN node of claim 26, wherein the processor is further configured for:
receiving, via the radio transceiver, information from the UE indicating a change in the service profile of the UE; and
in accordance with a determination that the selected serving node does not support the change in the service profile of the UE, selecting a new serving node for the UE at least in part based on the change in the service profile of the UE.

31. The RAN node of claim 30, wherein the processor is further configured for transmitting an indication of the new serving node to at least one of the UE, via the radio transceiver, or the selected serving node, via the backhaul transceiver.

32. The RAN node of claim 26, wherein the processor, being configured for selecting the selected serving node for the UE, is further configured for:
determining a set of one or more serving nodes capable of attaching to a UE having the service profile of the UE; and
wherein the processor, being configured for selecting the selected serving node for the UE, is further configured to base the selection of the selected serving node from among the set of one or more serving nodes, at least in part, on a capacity information element received from each serving node of the set of one or more serving nodes.

33. The RAN node of claim 26, wherein the processor is further configured for:
broadcasting, via the radio transceiver, a message comprising information indicating supported service profiles of a set of serving nodes associated with the RAN node.

34. A serving node in a wireless communication network, the serving node comprising:
a processor;
a memory communicatively coupled to the processor; and
a transceiver communicatively coupled to the processor,
wherein the processor is configured for:
receiving, via the transceiver, a connection request message from a radio access network (RAN) node, the connection request message configured to request a connection with a user equipment (UE) and comprising a service profile corresponding to the UE, the service profile being configured to indicate network behavior in relation to one or more services operational at the UE;
determining an identifier for the UE, the identifier being a function of the service profile corresponding to the UE; and
transmitting, via the transceiver, a connection accept message to the RAN node, the connection accept message comprising the identifier for the UE.

35. The serving node of claim 34, wherein the processor is further configured for:
receiving, via the transceiver, a message indicating an update to the service profile corresponding to the UE;
determining that the received message indicates that the UE is no longer supported by the serving node; and
transmitting, via the transceiver, information to another serving node that supports the updated service profile corresponding to the UE.

36. The serving node of claim 35, wherein the processor is further configured for transmitting information for the UE to the RAN node, via the transceiver, to indicate another serving node to the UE.

37. The serving node of claim 34, wherein the processor is further configured for:
receiving, via the transceiver, a signaling interface setup request message from the RAN node, configured to request establishment of a signaling interface between the RAN node and the serving node; and transmitting, via the transceiver, a response to the RAN node, comprising information relating to capabilities of the serving node to support one or more UE services.

38. The serving node of claim 37, wherein the information relating to capabilities of the serving node to support one or more service profiles comprises at least one of:
one or more UE services supported by the serving node; or
one or more device identifier prefixes supported by the serving node.

* * * * *